United States Patent
Kim et al.

(10) Patent No.: US 11,290,911 B2
(45) Date of Patent: Mar. 29, 2022

(54) METHOD FOR PROCESSING DATA BLOCK AND METHOD FOR HARQ ACK/NACK FEEDBACK

(71) Applicant: LG Electronics Inc., Seoul (KR)

(72) Inventors: Bonghoe Kim, Seoul (KR); Ilmu Byun, Seoul (KR); Jongwoong Shin, Seoul (KR); Jinwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 16/488,358

(22) PCT Filed: Jan. 16, 2018

(86) PCT No.: PCT/KR2018/000746
§ 371 (c)(1),
(2) Date: Aug. 23, 2019

(87) PCT Pub. No.: WO2018/155820
PCT Pub. Date: Aug. 30, 2018

(65) Prior Publication Data
US 2020/0236587 A1    Jul. 23, 2020

Related U.S. Application Data

(60) Provisional application No. 62/585,562, filed on Nov. 14, 2017, provisional application No. 62/544,696, (Continued)

(51) Int. Cl.
*H04W 28/04* (2009.01)
*H04L 1/18* (2006.01)

(52) U.S. Cl.
CPC ........... *H04W 28/04* (2013.01); *H04L 1/1864* (2013.01)

(58) Field of Classification Search
CPC ....... H04L 1/00; H04L 1/0041; H04L 1/0071; H04L 1/1614; H04L 1/1621;
(Continued)

(56) References Cited

U.S. PATENT DOCUMENTS

| 2012/0026963 | A1 | 2/2012 | Kim et al. |
| 2015/0039958 | A1 | 2/2015 | Vos |
| 2019/0334664 | A1* | 10/2019 | Guan .................... H04L 5/0055 |

FOREIGN PATENT DOCUMENTS

| CN | 101895925 | 11/2010 |
| CN | 102301792 | 12/2011 |

(Continued)

OTHER PUBLICATIONS

EP extended European search report, in European Appln. No. 18756609.6, dated Dec. 2, 2020, 11 pages.

(Continued)

*Primary Examiner* — Harry H Kim
*Assistant Examiner* — M Mostazir Rahman
(74) *Attorney, Agent, or Firm* — Fish & Richardson P.C.

(57) ABSTRACT

A method for transmitting a HARQ ACK/NACK feedback by a terminal may comprise: a step of transmitting, to a base station, a HARQ ACK/NACK feedback for a first downlink data, on a code block group (CBG) basis; a step of receiving, from the base station, a control channel including a specific control information; and a step of transmitting a HARQ ACK/NACK feedback on a transport block (TB) basis on the basis of the specific control information, for a second downlink data scheduled and received by the control channel, even if a CBG based retransmission is set for the terminal.

12 Claims, 12 Drawing Sheets

Related U.S. Application Data filed on Aug. 11, 2017, provisional application No. 62/490,631, filed on Apr. 27, 2017, provisional application No. 62/462,947, filed on Feb. 24, 2017.

(58) Field of Classification Search
CPC ... H04L 1/1864; H04L 1/1896; H04L 5/0053; H04L 5/0055; H04W 28/04
See application file for complete search history.

(56) References Cited

FOREIGN PATENT DOCUMENTS

| | | |
|---|---|---|
| CN | 102355341 | 2/2012 |
| CN | 102461039 | 5/2012 |
| CN | 105406944 | 3/2016 |
| CN | 105515719 | 4/2016 |
| EP | 2224633 | 9/2010 |
| EP | 3166249 | 5/2017 |
| KR | 20100115320 | 10/2010 |
| WO | WO2011017621 | 2/2011 |
| WO | WO2012094635 | 7/2012 |
| WO | WO2015099416 | 7/2015 |
| WO | WO2016/003229 | 1/2016 |
| WO | WO2016126330 | 8/2016 |

OTHER PUBLICATIONS

Mediatek, Inc., "On multiple HARQ bits per TB and feedback mechanism," R1-1702738, 3GPP TSG RAN WG1 Meeting #88, Athens, Greece, Feb. 13-17, 2017, 4 pages.

Samsung, "CB-group based retransmission for eMBB," R1-1702990, 3GPP TSG RAN WG1 Meeting #88, Athens, Greece, Feb. 13-17, 2017, 9 pages.

PCT International Search Report and Written Opinion in International Application No. PCT/KR2018/000746, dated Apr. 24, 2018, 20 pages (with English translation).

Office Action in Chinese Appln. No. 201880013654.4, dated Jul. 2, 2021, 23 pages (with English translation).

Texas Instruments, "Specifying Basic Building Blocks of UL Multi-Antenna Transmission," R1-104481, 3GPP TSG RAN WG1 62, Madrid, Spain, dated Aug. 23-27, 2010, 8 pages.

Notice of Allowance in Chinese Appln. No. 201880013654.4, dated Jan. 18, 2022, 6 pages (with English translation).

Xingbing et al., "Research and Design of CRC Module Based on Code Block Segmentation in TD-LTE." Shanxi Electronic Technology, 2012, 4(1674-4578), 3 pages (with English abstract).

* cited by examiner

METHOD FOR PROCESSING DATA BLOCK AND METHOD FOR HARQ ACK/NACK FEEDBACK

CROSS-REFERENCE TO RELATED APPLICATIONS

This application is a National Stage application under 35 U.S.C. § 371 of International Application No. PCT/KR2018/000746, filed on Jan. 16, 2018, which claims the benefit of U.S. Provisional Application No. 62/585,562, filed on Nov. 14, 2017, U.S. Provisional Application No. 62/544,696, filed on Aug. 11, 2017, U.S. Provisional Application No. 62/490,631, filed on Apr. 27, 2017, and U.S. Provisional Application No. 62/462,947, filed on Feb. 24, 2017. The disclosures of the prior applications are incorporated by reference in their entirety.

TECHNICAL FIELD

The present invention relates to wireless communication, and more particularly, to a method for processing data blocks and a method for HARQ ACK/NACK feedback.

BACKGROUND ART

In the next generation 5G system, scenarios can be divided into Enhanced Mobile Broadband (eMBB), Ultra-reliable Machine-Type Communications (uMTC), Massive Machine-Type Communications (mMTC), etc. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. (for example, the uMTC may include V2X, emergency services, remote control, etc.). The mMTC corresponds to a next generation mobile communication scenario characterized by low cost, low energy, short packets, massive connectivity, etc. (for example, the mMTC may include Internet of Things (IoT)).

DISCLOSURE OF THE INVENTION

Technical Task

An object of the present invention is to provide a method for transmitting HARQ ACK/NACK feedback by a terminal.

Another object of the present invention is to provide a method for receiving HARQ ACK/NACK feedback by a base station.

Another object of the present invention is to provide a terminal for transmitting HARQ ACK/NACK feedback.

Another object of the present invention is to provide a base station for receiving HARQ ACK/NACK feedback.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The object of the present invention can be achieved by providing a method for transmitting HARQ ACK/NACK feedback by a terminal, the method including transmitting HARQ ACK/NACK feedback for each code block group (CBG) for first downlink data to a base station, receiving a control channel containing specific control information from the base station, and transmitting HARQ ACK/NACK feedback for each transport block (TB) based on the specific control information for second downlink data scheduled and received by the control channel, even when CBG-based retransmission is configured in the terminal.

The transmitting of the HARQ ACK/NACK feedback for each CBG may include transmitting HARQ ACK feedback for a corresponding CBG only when decoding is successfully performed on all code blocks in the corresponding CBG. The TB may include a plurality of CBGs. The specific control information may correspond to control information for a fall-back operation of the terminal or control information related to the HARQ ACK/NACK feedback for each TB. The control channel containing the specific control information may be received during a period for reconfiguring the number of code blocks in a CBG for transmission of HARQ ACK/NACK feedback. The method may further include receiving RRC signaling for reconfiguring the number of code blocks in the CBG. The HARQ ACK/NACK feedbacks for each CBG of the first downlink data may be multiplexed and transmitted.

In another aspect of the present invention, provided herein is a method for receiving HARQ ACK/NACK feedback by a base station, the method including receiving HARQ ACK/NACK feedback for each code block group (CBG) for first downlink data from a terminal, receiving a control channel containing specific control information to the terminal, and receiving HARQ ACK/NACK feedback for each transport block (TB) from the terminal according to the specific control information for second downlink data scheduled and received by the control channel, even when CBG-based retransmission is configured in the terminal. The specific control information may correspond to control information for a fall-back operation of the terminal or control information related to the HARQ ACK/NACK feedback for each TB. The control channel containing the specific control information may be transmitted during a period for reconfiguring the number of code blocks in a CBG for transmission of HARQ ACK/NACK feedback.

In another aspect of the present invention, provided herein is a terminal for transmitting HARQ ACK/NACK feedback, including a transmitter, a receiver, and a processor, wherein the processor may be configured to control the transmitter to transmit HARQ ACK/NACK feedback for each code block group (CBG) for first downlink data to a base station, control the receiver to receive a control channel containing specific control information from the base station, and control the transmitter to transmit HARQ ACK/NACK feedback for each transport block (TB) based on the specific control information for second downlink data scheduled and received by the control channel, even when CBG-based retransmission is configured in the terminal.

The processor may be configured to control the transmitter to HARQ ACK feedback for a corresponding CBG only when decoding is successfully performed on all code blocks in the corresponding CBG. The specific control information may correspond to control information for a fall-back operation of the terminal or control information related to the HARQ ACK/NACK feedback for each TB. The processor may control the receiver to receive the control channel containing the control information for the fall-back operation during a period for reconfiguring the number of code blocks in a CBG for transmission of HARQ ACK/NACK feedback. The processor may control the receiver to receive RRC signaling for reconfiguring the number of code blocks in the CBG.

The processor may be configured to multiplex the HARQ ACK/NACK feedbacks for each CBG of the first downlink data, wherein the processor may control the transmitter to transmit the multiplexed HARQ ACK/NACK feedbacks.

In another aspect of the present invention, provided herein is a base station for receiving HARQ ACK/NACK feedback, including a receiver, a transmitter, and a processor, wherein the processor is configured to control the receiver to receive HARQ ACK/NACK feedback for each code block group (CBG) for first downlink data from a terminal, control the transmitter to transmit a control channel containing specific control information to the terminal, and control the receiver to receive HARQ ACK/NACK feedback for each transport block (TB) from the terminal for second downlink data scheduled and received by the control channel, even when CBG-based retransmission is configured in the terminal. The specific control information may correspond to control information for a fall-back operation of the terminal or control information related to the HARQ ACK/NACK feedback for each TB.

Advantageous Effects

According to an embodiment of the present invention, communication performance may be remarkably improved by processing of data blocks and a method for HARQ ACK/NACK feedback.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

BEST MODE FOR INVENTION

Figure 1:
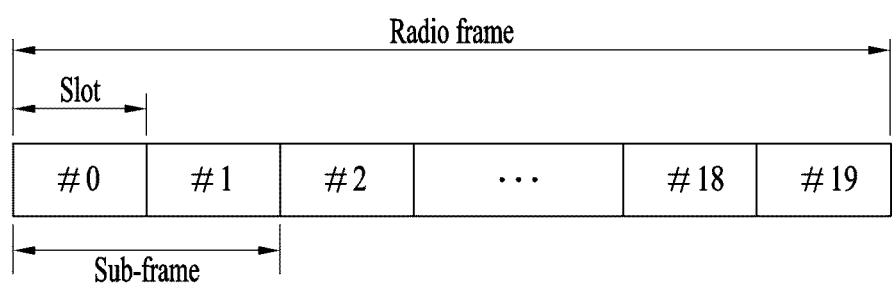
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
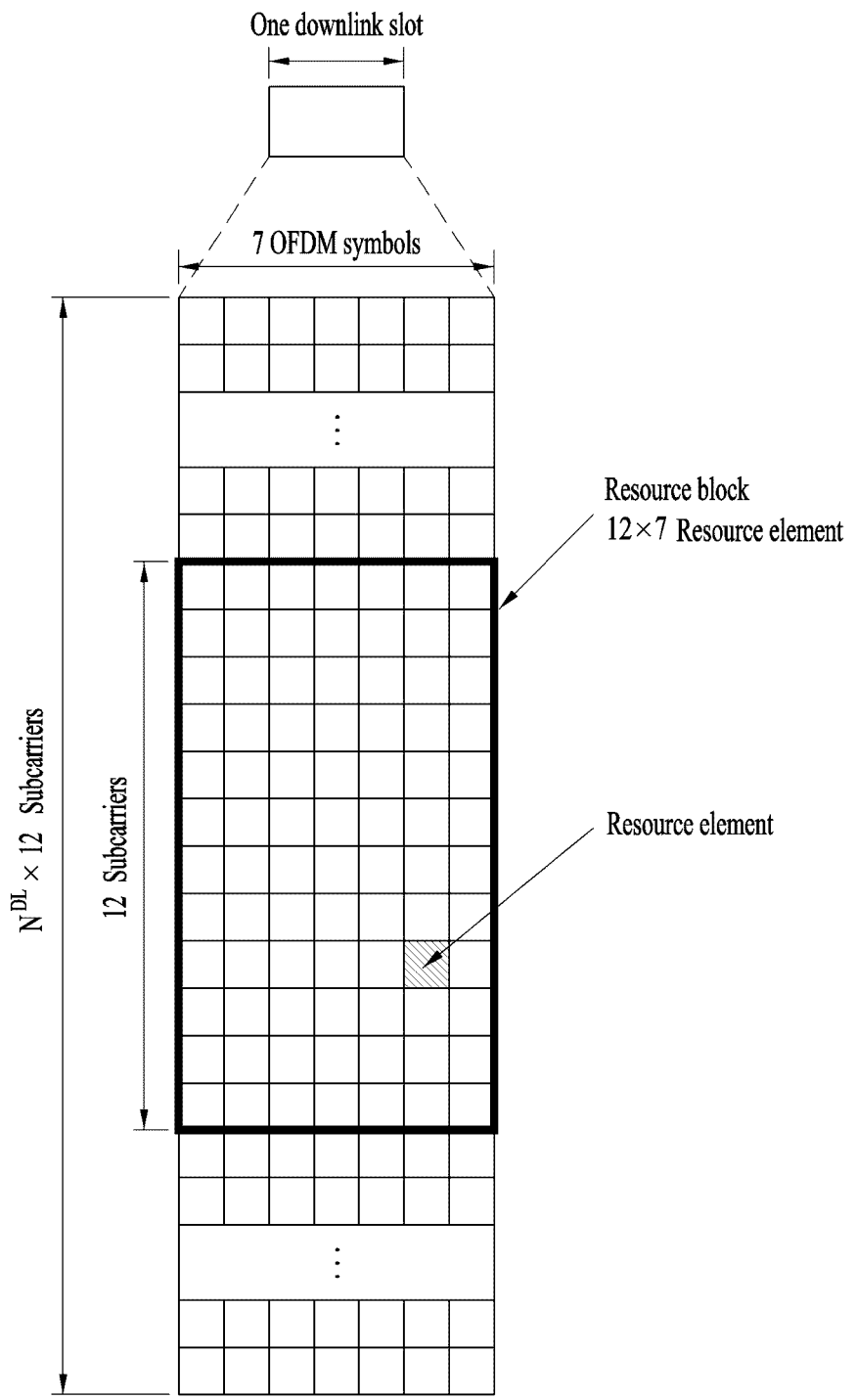
FIG. 2 is a diagram showing the frame structure used in a Long Term Evolution (LTE)/LTE-A system.

FIG. 2 illustrates frame structures used in 3GPP LTE/LTE-A system.

Referring to FIG. 2, one frame corresponds to 10 ms and consists of 10 1-ms subframes. A time required for transmitting one subframe is defined as a transmission time interval (TTI). For example, one subframe consists of two 0.5 ms slots, and each slot consists of seven (or six) orthogonal frequency division multiplexing (OFDM) symbols. The 3GPP LTE system uses OFDMA on downlink, and the OFDM symbol represents one symbol period. An OFDM symbol may be referred to as an SC-FDMA symbol or a symbol period. A resource block (RB), which is a resource allocation unit, includes a plurality of adjacent subcarriers in one slot. The structure of a radio frame shown in FIG. 2 is exemplary and the number of subframes included in a radio frame, the number of slots included in a subframe, or the number of OFDM symbols included in one slot may be changed in various ways.

One resource block (RB) is defined by 12 subcarriers at intervals of 15 kHz and 7 OFDM symbols. A BS transmits a Primary Synchronization Signal (PSS) and a Secondary Synchronization Signal (SSS) for synchronization, and a Physical Broadcast Channel (PBCH) for system information in 6 RBs at a center frequency. Here, the radio frame structure, the signal, and the position of the channel may depend on normal/extended Cyclic Prefix (CP) and Time Division Duplex (TDD)/Frequency Division Duplex (FDD).

Figure 3:
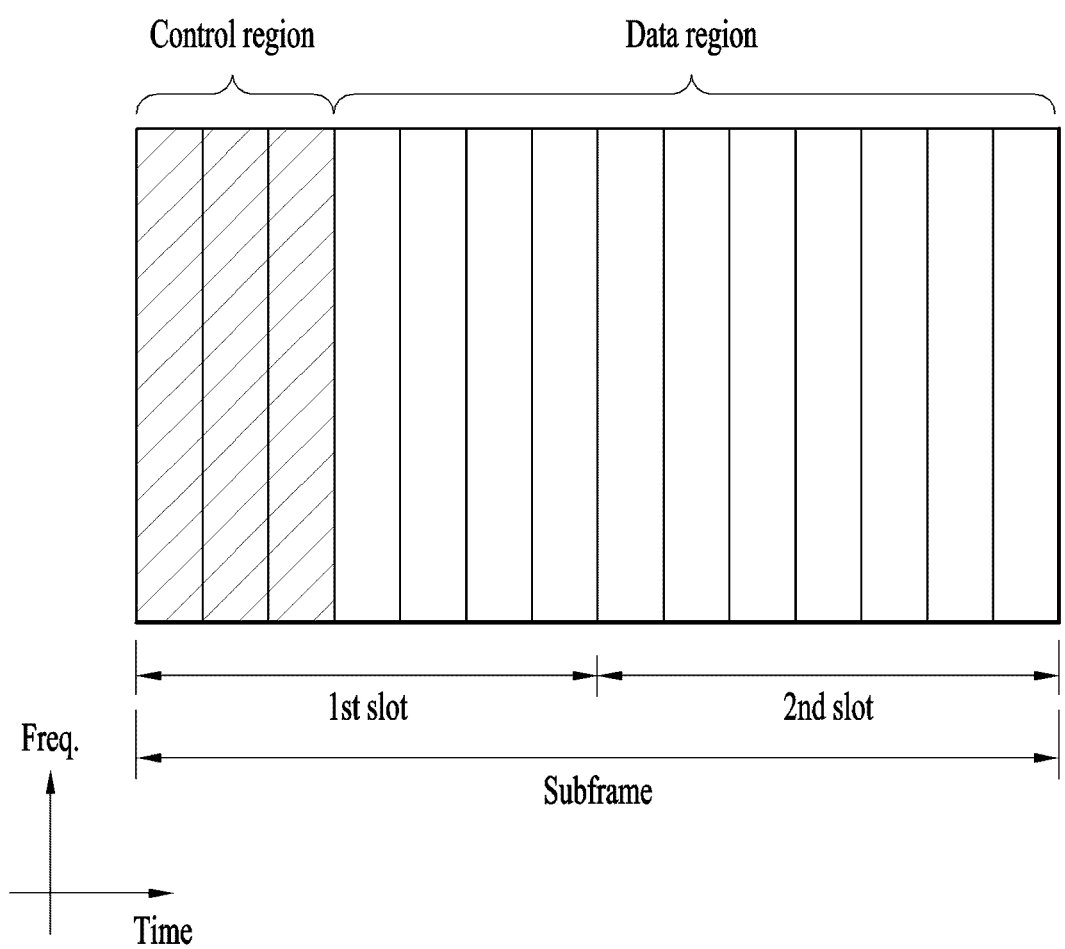
FIG. 3 is a diagram illustrating an exemplary resource grid for the duration of a downlink slot used in 3GPP LTE/LTE-A system, which is an example of a wireless communication system.

FIG. 3 is a diagram illustrating an exemplary resource grid for the duration of a downlink slot used in 3GPP LTE/LTE-A system, which is an example of a wireless communication system.

Referring to FIG. 3, a DL slot includes a plurality of OFDM symbols in the time domain. One DL slot includes 7 (or 6) OFDM symbols and a resource block may include 12 subcarriers in a frequency domain. Each element on a resource grid is called a resource element (RE). One RB includes 12×7 or 12×6 REs. The number $N_{RB}$ of RBs included in the DL slot depends on a DL transmission band. A structure of a UL slot is identical to that of the DL slot but OFDM symbol is replaced by SC-FDMA symbol.

Figure 4:
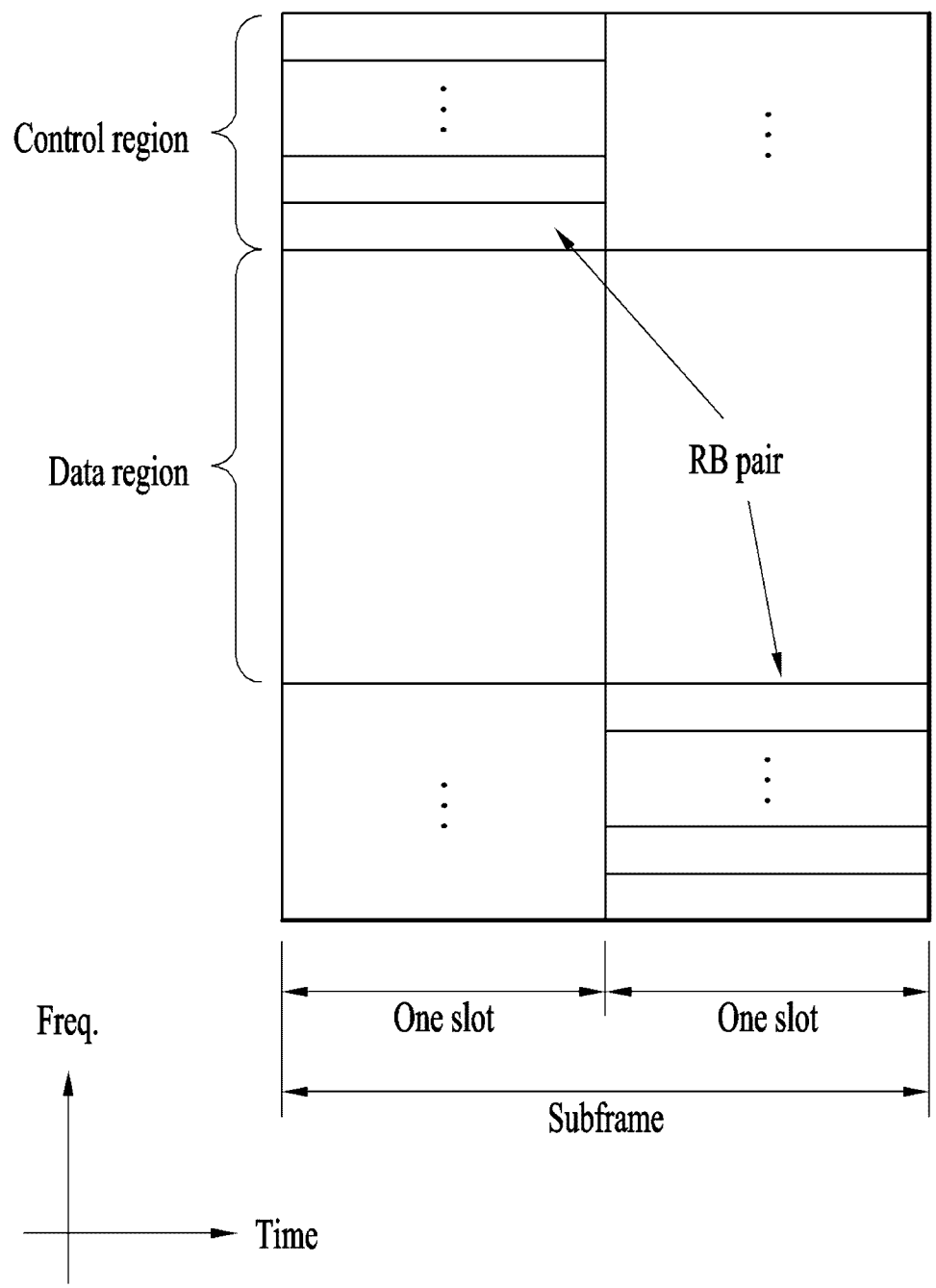
FIG. 4 is a diagram illustrating an exemplary structure of a downlink subframe used in 3GPP LTE/LTE-A system, which is an example of a wireless communication system.

FIG. 4 is a diagram illustrating an exemplary structure of an downlink subframe used in 3GPP LTE/LTE-A system, which is an example of a wireless communication system.

Referring to FIG. 4, up to three(four) OFDM symbols at the start of the first slot in a downlink subframe are used for a control region to which control channels are allocated and the other OFDM symbols of the downlink subframe are used for a data region to which a PDSCH is allocated. Downlink control channels used in the LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission.

Control information transmitted on PDCCH is called DCI (downlink control information). Regarding DCI formats, Format 0 is defined for uplink and Format 1, Format 1A, Format 1B, Format 1C, Format 1D, Format 2, Format 2A, Format 3, Format 3A and the like are defined for downlink. Depending on usages, DCI format selectively includes such information as hopping flag, RB assignment, MCS (modulation coding scheme), RV (redundancy version), NDI (new data indicator), TPC (transmit power control), cyclic shift DM RS (demodulation reference signal), CQI (channel quality information) request, HARQ process number, TPMI (transmitted precoding matrix indicator), PMI (precoding matrix indicator) confirmation and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 5:
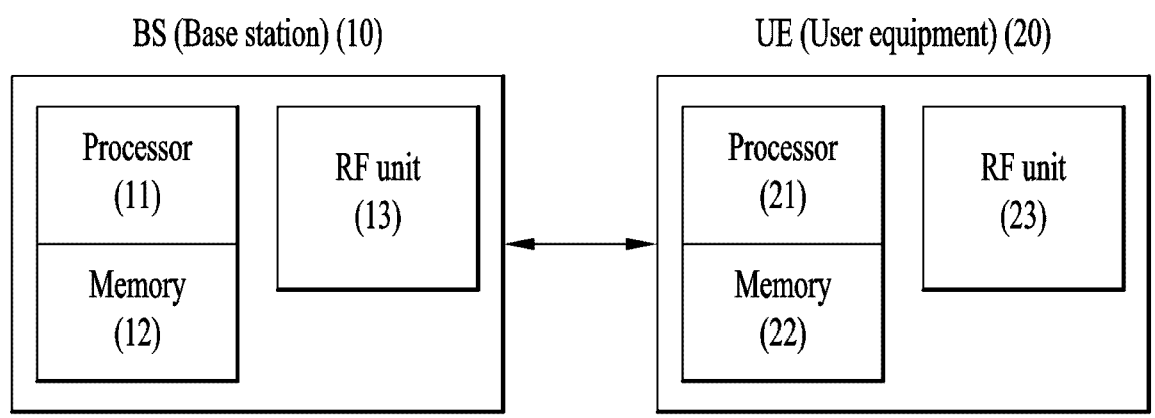
FIG. 5 is a diagram illustrating an exemplary structure of an uplink subframe used in 3GPP LTE/LTE-A system, which is an example of a wireless communication system.

FIG. 5 is a diagram illustrating an exemplary structure of an uplink subframe used in 3GPP LTE/LTE-A system, which is an example of a wireless communication system.

Referring to FIG. 5, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

SR (scheduling request): this is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted informations.

Physical Downlink Control CHannel (PDCCH) Transmission

PDCCH corresponds to a downlink control channel. The PDCCH is configured to transmit control information for transmitting PDSCH/PUSCH for a specific UE and transmit a power control command for a plurality of UEs. The PDCCH occupies maximum 4 OFDM symbols in time domain and PCFICH indicates the number of OFDM symbols assigned to the PDCCH. Meanwhile, the PDCCH is transmitted over system whole band in frequency domain and uses QPSK for modulation. A resource used for transmitting the PDCCH is referred to as a CCE (control channel element). Since the CCE consists of 36 resource elements, it may be able to transmit 72 bits via a single CCE. The amount of control information transmitted on the PDCCH may vary depending on a transmission mode. Control information according to a transmission mode is regulated by a DCI format. A UE determines whether or not PDSCH/PUSCH is transmitted according to a PDCCH decoding result. In this case, PDCCH scrambling is performed using UE ID information (C-RNTI) of a corresponding UE. In particular, if a UE detects a DCI format, which is transmitted in a manner of being scrambled by a UE ID of the UE, the UE transmits PUSCH or receives PDSCH according to PDCCH control information. In general, one subframe includes a plurality of PDCCHs capable of being transmitted. Hence, it is necessary for a UE to check whether or not there is control information transmitted to the UE by performing decoding on a plurality of the PDCCHs. However, if the UE performs decoding on all of a plurality of the PDCCHs, complexity is considerably increased. Hence, the number of performing decoding is limited. When control information is transmitted via PDCCH, the control information can be transmitted in a manner of one CCE or concatenating a plurality of CCEs with each other. This is referred to as CCE aggregation. Currently, a permitted CCE aggregation level is 1, 2, 4 and 8. If the CCE aggregation level corresponds to 4, it indicates that control information of a corresponding UE is transmitted in a manner of concatenating 4 CCEs with each other. A UE sets limit on the decoding number according to each aggregation level. Table 1 in the following shows the decoding number according to an aggregation level.

TABLE 1

| Type | Search space $S_k^{(L)}$ | | Number of PDCCH candidates $M^{(L)}$ |
|------|---------------------------|---|-----------|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 1, in case of a common type, a UE performs decoding on PDCCHs, which are transmitted by an aggregation level 4 and 8, 4 times and 2 times, respectively, to determine whether or not control information is transmitted. A specific CCE constructing PDCCH corresponds to a region commonly known to all UEs. In case of a UE-specific type, unlike the common type, a UE performs decoding on PDCCHs, which are transmitted by an aggregation level 1, 2, 4, and 8, 6, 6, 2 and 2 times, respectively, to determine whether or not control information is transmitted. In this case, a CCE is differently configured according to a UE. This can be represented as equation 1 described in the following.

$$Y_k = (A \cdot Y_{k-1}) \bmod D \quad [\text{Equation 1}]$$

In this case, $Y_{-1} = n_{RNTI} \neq 0$, A=39827, D=65537 and $k = \lfloor n_s/2 \rfloor$. $n_s$ corresponds to a slot number in a radio frame.

Figure 6:
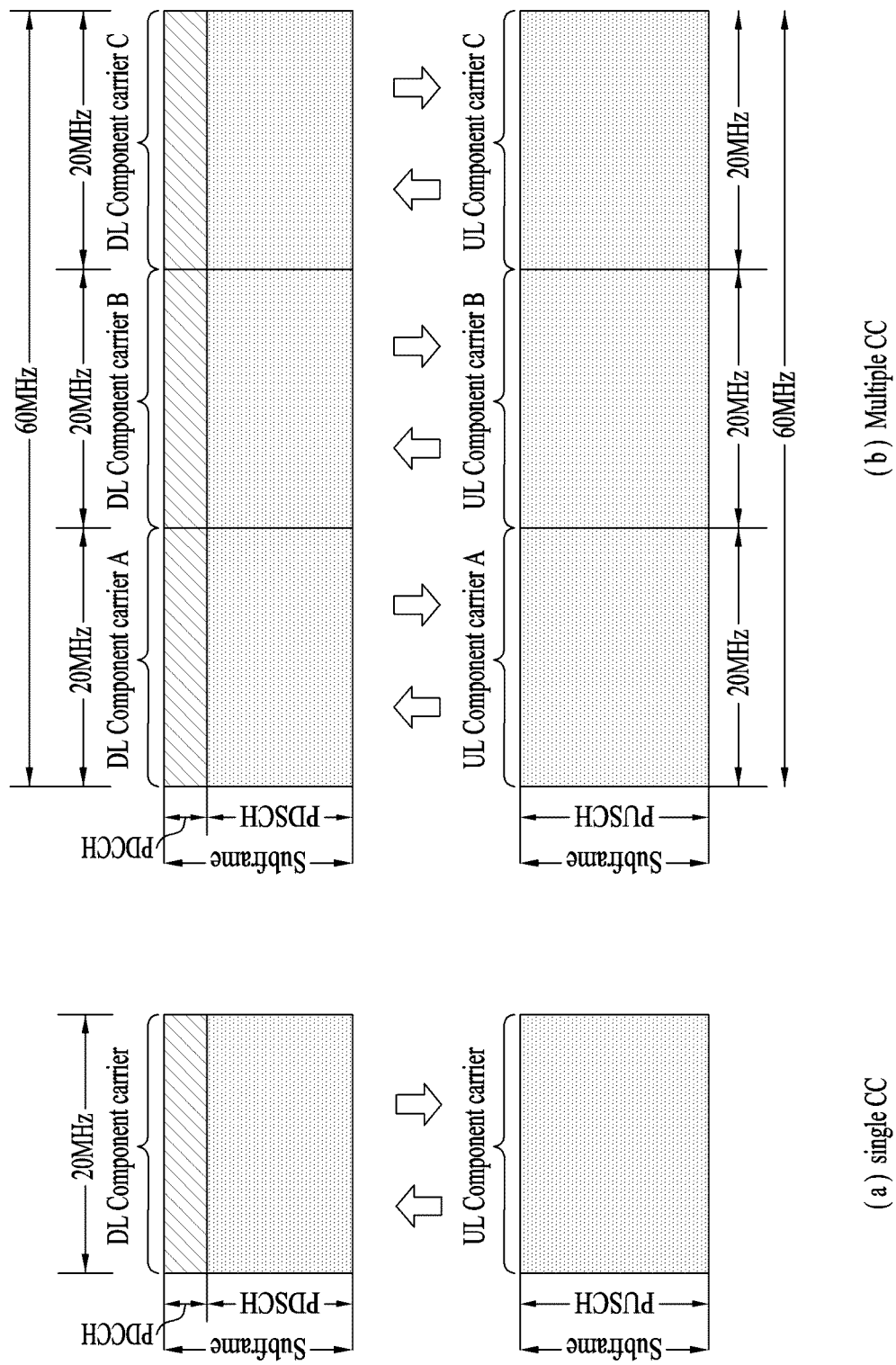
FIG. 6 is a diagram illustrating an example of carrier aggregation used for component carriers (CCs) and the LTE-A system employed in embodiments of the present invention.

FIG. 6 is a diagram illustrating an example of component carriers (CCs) used in embodiments of the present invention and carrier aggregation used in the LTE-A system.

FIG. 6(a) shows a single carrier structure used in the LTE system. The component carriers include DL CC and UL CC. One CC may have a frequency range of 20 MHz.

FIG. 6(b) shows a carrier aggregation structure used in the LTE-A system. FIG. 6(b) illustrates a case where 3 CCs having a frequency range of 20 MHz are aggregated. While it is illustrated that there are three DL CCs and three UL CCs, the number of DL CCs and UL CCs is not limited. In the case of carrier aggregation, the UE may simultaneously monitor three CCs, receive downlink signals/data, and transmit uplink signals/data.

If N DL CCs are managed in a specific cell, the network may allocate M (M≤N) DL CCs to the UE. In this case, the UE may monitor only M limited DL CCs and receive a DL signal. In addition, the network may assign priorities to L (L≤M≤N) DL CCs to allocate a main DL CC to the UE. In this case, the UE should monitor the L DL CCs. This scheme may be applied to UL transmission in the same manner.

The linkage between the carrier frequency (or DL CC) of a DL resource and the carrier frequency (or UL CC) of a UL resource may be indicated by a highly layer message, such as an RRC message, or system information. For example, a combination of a DL resource and a UL resource may be configured by a linkage defined by System Information Block Type2 (SIB2). Specifically, the linkage may refer to a mapping relationship between a DL CC on which the PDCCH carrying a UL grant is transmitted and a UL CC that uses the UL grant, or a mapping relationship between a DL CC (or UL CC) on which data for HARQ is transmitted and a UL CC (or DL CC) on which a HARQ ACK/NACK signal is transmitted.

Cross Carrier Scheduling

In the carrier aggregation system, scheduling for a carrier or a serving cell is divided into two methods: self-scheduling and cross carrier scheduling. Cross carrier scheduling may be referred to as cross component carrier scheduling or cross cell scheduling.

The self-scheduling means that the PDCCH (UL Grant) and the PDSCH are transmitted on the same DL CC, or that the PUSCH to be transmitted according to the PDCCH (UL Grant) is transmitted on a UL CC linked with the DL CC on which the UL Grant is received.

The cross carrier scheduling means that the PDCCH (DL Grant) and the PDSCH are transmitted on different DL CCs, or that the PUSCH to be transmitted according to the PDCCH (UL Grant) transmitted on a DL CC is transmitted on a UL CC different from the UL CC linked with the DL CC on which the UL grant is received.

The cross-carrier scheduling may be UE-specifically enabled or disabled and may be semi-statically announced for each UE through higher layer signaling (e.g., RRC signaling).

When the cross-carrier scheduling is enabled, a carrier indicator field (CIF) indicating a DL/UL CC through which the PDSCH/PUSCH indicated by the PDCCH is transmitted is required for the PDCCH. For example, the PDCCH may allocate a PDSCH resource or a PUSCH resource to one of multiple CCs using the CIF. That is, the CIF is configured when the PDCCH on the DL CC allocates a PDSCH or PUSCH resource to one of the multi-aggregated DL/UL CCs. In this case, the DCI format of LTE Release-8 may be extended according to the CIF. Here, the configured CIF may be fixed as a 3-bit field or the position of the configured CIF may be fixed regardless of the DCI format size. In addition, the PDCCH structure of LTE Release-8 (resource mapping based on the same CCE and the same coding) may be reused.

On the other hand, when the PDCCH on the DL CC allocates PDSCH resources on the same DL CC or allocates PUSCH resources on a single linked UL CC, the CIF is not configured. In this case, the same PDCCH structure (resource mapping based on the same CCE and the same coding) and DCI format as LTE Release-8 may be used.

When cross carrier scheduling is allowed, the UE needs to monitor PDCCHs for a plurality of DCIs in the control region of a monitoring CC according to the transmission mode and/or bandwidth for each CC. Therefore, configuration of a search space and PDCCH monitoring for supporting such an operation are needed.

In the carrier aggregation system, a UE DL CC set represents a set of DL CCs scheduled for a UE to receive a PDSCH, and a UE UL CC set represents a set of UL CCs scheduled for a UE to transmit a PUSCH. Also, a PDCCH monitoring set represents a set of at least one DL CC on which PDCCH monitoring is performed. The PDCCH monitoring set may be the same as the UE DL CC set or may be a subset of the UE DL CC set. The PDCCH monitoring set may include at least one of the DL CCs in the UE DL CC set. Alternatively, the PDCCH monitoring set may be defined independently of the UE DL CC set. The DL CC included in the PDCCH monitoring set may be configured so as to always enable self-scheduling for the linked UL CC.

The UE DL CC set, the UE UL CC set, and the PDCCH monitoring set may be UE-specifically, UE group-specifically, or cell-specifically configured.

When the cross carrier scheduling is disabled, which means that the PDCCH monitoring set is always the same as the DL CC set, no indication such as separate signaling for the PDCCH monitoring set is required. However, when the cross carrier scheduling is enabled, the PDCCH monitoring set may be defined in the UE DL CC set. That is, in order to schedule the PDSCH or the PUSCH for the UE, the BS transmits the PDCCH only through the PDCCH monitoring set.

Figure 7:
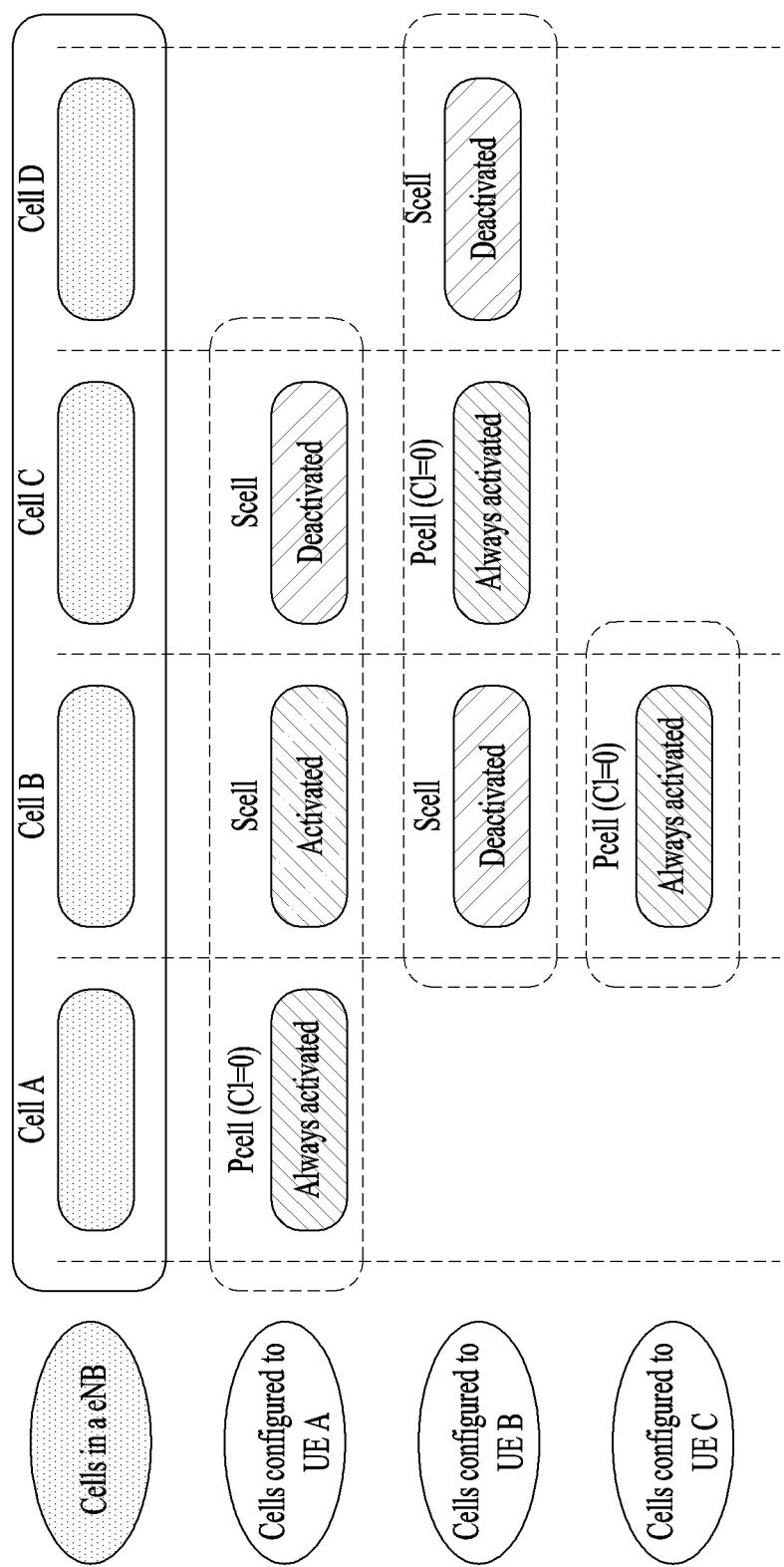
FIG. 7 is a diagram illustrating an example of configuration of a serving cell according to cross carrier scheduling.

FIG. 7 is a diagram illustrating an example of configuration of a serving cell according to cross carrier scheduling.

In a wireless access system supporting carrier aggregation (CA), a BS and/or UEs may be configured with one or more serving cells. In FIG. 7, it is assumed that the BS is capable of supporting four serving cells, which are cell A, cell B, cell C, and cell D, UE A is configured with cells A, B, and C, UE B is configured with cells B, C, and D, and UE C is configured with cell B. Here, at least one of the cells configured for each UE may be configured as a Pcell. The Pcell is always active, and the Scell may be activated or deactivated by the BS and/or the UE.

The cells configured in FIG. 7 are cells that can be added to CA based on a measurement report message from a UE among the cells of the BS, and may be configured for each UE. The configured cells pre-reserve resources for ACK/NACK message transmission for PDSCH signal transmission. An activated cell is a cell configured to actually transmit a PDSCH signal and/or a PUSCH signal among the configured cells, and is used to perform CSI reporting and Sounding Reference Signal (SRS) transmission. A deactivated cell is a cell configured not to transmit/receive a PDSCH/PUSCH signal by a command of a BS or a timer operation. In the deactivated cell, the CSI report and the SRS transmission are also interrupted.

Physical Resource Block (PRB) Bundling

In case of a UE supporting a transmission mode 9, the UE can configure PMI/RI feedback via higher layer. The transmission mode 9 UE to which the PMI/RI feedback is configured may make an assumption on granularity of a physical resource block that applies the same precoding to PDSCH and a DM RS. In particular, the UE performs channel estimation under the assumption that the same precoding is applied to a precoding resource block group (PRG) according to a system bandwidth to enhance channel estimation capability. Table 2 in the following shows values of a PRG size according to a system bandwidth.

TABLE 2

| PRG size according to system bandwidth | |
|---|---|
| System bandwidth ($N_{RB}^{DL}$) | PRG size (PRBs) |
| <=10 | 1 |
| 11~26 | 2 |
| 27~63 | 3 |
| 64~110 | 2 |

Channel Encoding

In a general communication system, in order to make a receiving end correct an error occurred at a channel, a transmitting end performs coding on information transmitted by the transmitting end using a forward error correction code and transmits the information. Having received the information, the receiving end performs demodulation on a reception signal, performs a decoding procedure on the error correction code, and restores the information. An error of the reception signal caused by a channel can be corrected by the decoding procedure. The error correction code may include various types. In the present invention, a turbo code is explained as an example of the error correction code. The turbo code consists of a recursive systematic convolution encoder and an interleaver. When the turbo code is actually implemented, an interleaver may exist to easily perform parallel decoding. QPP (quadratic polynomial permutation) is a sort of the interleaver. It is known as the QPP interleaver maintains good performance on a specific data block size only. It is known as the performance of the turbo code is getting better as a size of a data block is getting bigger. In an actual communication system, if a data block has a size equal to or greater than a prescribed size, the data block is divided into a plurality of small data blocks to easily perform encoding. A divided small data block is referred to as a code block. In general, code blocks have the same size. Yet, due to a size restriction of the QPP interleaver, one of a plurality of code blocks may have a different size. The error correction encoding procedure is performed in a unit of a determined interleaver size code block and interleaving is performed to reduce an impact of a burst error, which occurs when transmission is performed via a radio channel. The code block is transmitted in a manner of being mapped to an actual radio resource. Since the amount of radio resources used for performing actual transmission is constant, it is necessary to perform rate matching on the encoded code block to match with the amount of radio resource. In general, rate matching is performed by puncturing or repetition. The rate matching can be performed in such a unit of an encoded code block similar to WCDMA of 3GPP. As a different method, it may be able to separately perform the rate matching in a manner of dividing the encoded code block into a systematic part and a parity part.

Figure 8:
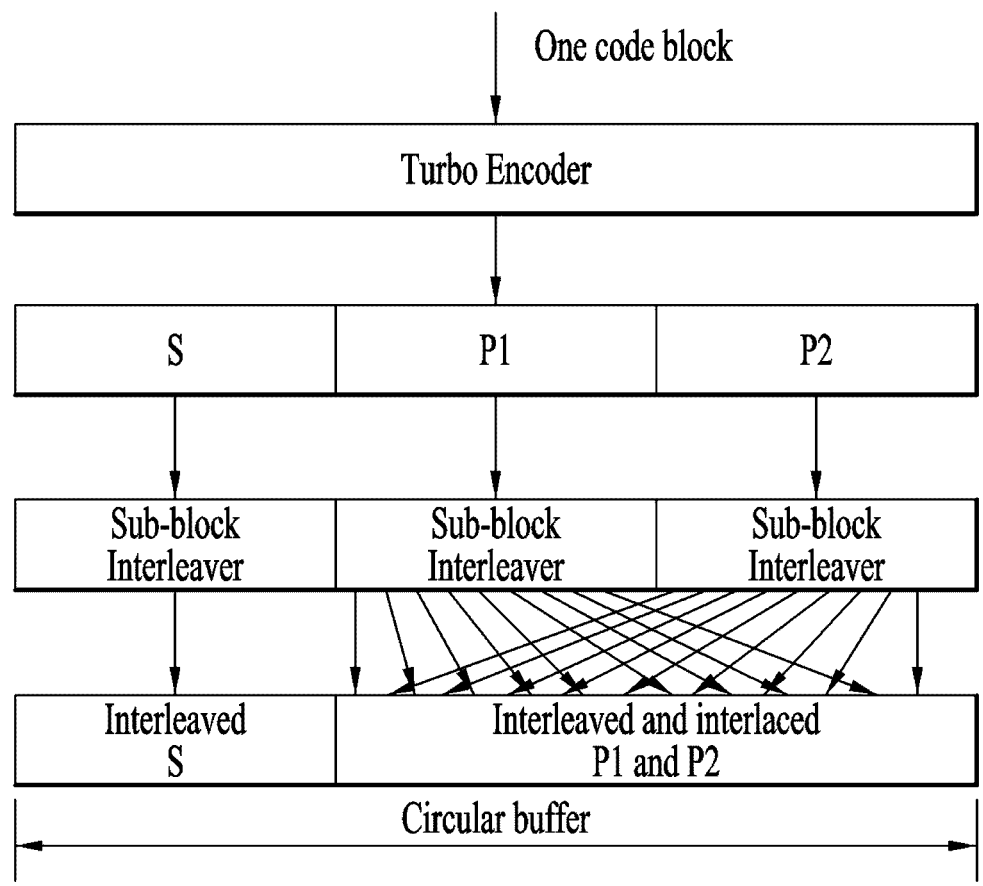
FIG. 8 illustrates rate matching block diagram.

FIG. 8 illustrates rate matching block diagram.

FIG. 8 corresponds to a block diagram for performing rate matching in a manner of dividing an encoded code block into a systematic part and a parity part. In this case, assume that a code rate corresponds to 1/3. In this case, a CRC for detecting an error is attached to a data block transmitted by higher layer. For clarity of implementation, a CRC is attached to a segmented code block as well. It is necessary to define various data block sizes according to a service type of higher layer. Yet, since it is necessary to signal the various data block sizes to a receiving end, quantization is required. When the quantization is performed, in order to match a size of a source data block transmitted by higher later with a size of a data block of a physical layer, a dummy bit is attached. When the quantization is performed, it is preferable to minimize the amount of attached dummy bits. A data block size, modulation and coding rate, and the number of allocated resources become functional relation with each other. In particular, one parameter is determined by values of other two parameters. Hence, in case of signaling parameters, it may signal two parameters only. In the following, for clarity, assume that modulation and coding rate and the number of allocated resources are used to inform a receiving end of a data block size. In this case, a pilot signal or a reference signal for channel estimation, a resource for transmitting control information, and the like may influence on the number of allocated resources according to an antenna configuration. A factor influencing on the number of allocated resources may change at every transmission instant.

Rate Matching

Figure 9:
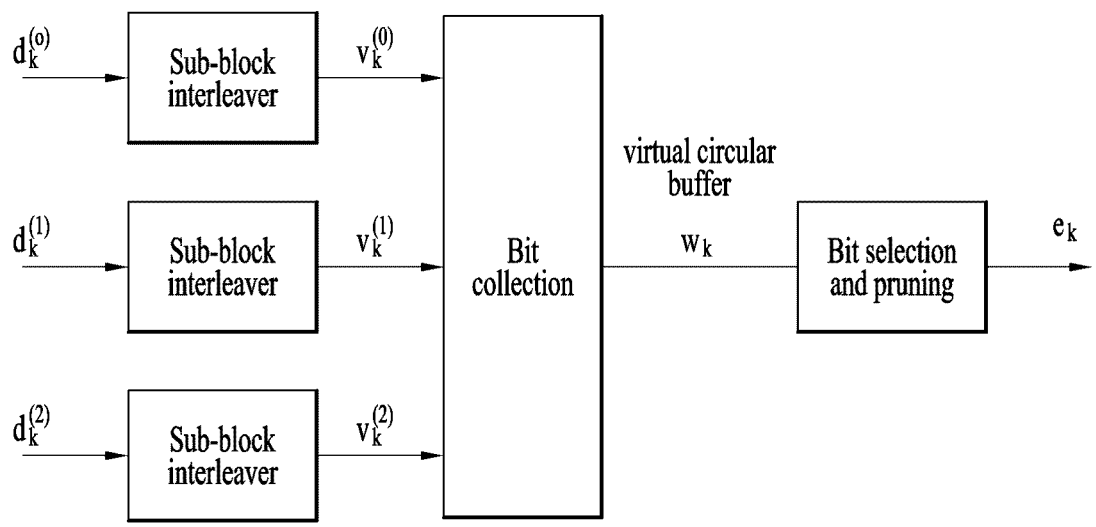
FIG. 9 illustrates rate matching for turbo coded transport channels.

FIG. 9 illustrates rate matching for turbo coded transport channels.

Details of the rate matching for turbo coded transport channels according to FIG. 9 may be represented as shown in Table 3 below.

TABLE 3

The rate matching for turbo coded transport channels is defined per coded block and consists of interleaving the three information bit streams $d_k^{(0)}$, $d_k^{(1)}$, and $d_k^{(2)}$, followed by the collection of bits and the generation of a circular buffer as depicted in FIG. 9. The output bits for each code block are transmitted as described in section 5.1.4.3.2 of 3GPP LTE TS 36.212 standard document.
The bit stream $d_k^{(0)}$ is interleaved according to the sub-block interleaver defined in section 5.1.4.3.1 of 3GPP LTE TS 36.212 standard document with an output sequence defined as $v_0^{(0)}, v_1^{(0)}, v_2^{(0)}, \ldots, v_{K_\Pi-1}^{(0)}$ and where $K_\Pi$ is defined in section 5.1.4.3.1 of 3GPP LTE TS 36.212 standard document. The bit stream $d_k^{(1)}$ is interleaved according to the sub-block interleaver defined in section 5.1.4.3.1 of 3GPP LTE TS 36.212 standard document with an output sequence defined $v_0^{(1)}, v_1^{(1)}, v_2^{(1)}, \ldots, v_{K_\Pi-1}^{(1)}$. The bit stream $d_k^{(2)}$ is interleaved according to the sub-block interleaver defined in section 5.1.4.3.1 with an output sequence defined as $v_0^{(2)}, v_1^{(2)}, v_2^{(2)}, \ldots, v_{K_\Pi-1}^{(2)}$.
The sequence of bits $e_k$ for transmission is generated according to section 5.1.4.3.2 of 3GPP LTE TS 36.212 standard document.

Sub-Block Interleaver

Table 4 below shows a specific description of the sub-block interleaver.

TABLE 4

The bits input to the block interleaver are denoted by $d_0^{(i)}, d_1^{(i)}, d_2^{(i)}, \ldots, d_{D-1}^{(i)}$, where D is the number of bits. The output bit sequence from the block interleaver is derived as follows:
(1) Assign $C_{subblock}^{TC} = 32$ to be the number of columns of the matrix. The columns of the matrix are numbered 0, 1, 2, . . . , $C_{subblock}^{TC}$-1 from left to right.
(2) Determine the number of rows of the matrix $R_{subblock}^{TC}$, by finding minimum integer $R_{subblock}^{TC}$ such that:
$D \leq (R_{subblock}^{TC} \times C_{subblock}^{TC})$
The rows of rectangular matrix are numbered 0, 1, 2, . . . , $R_{subblock}^{TC}$-1 from top to bottom.
(3) If $(R_{subblock}^{TC} \times C_{subblock}^{TC}) > D$, then $N_D = (R_{subblock}^{TC} \times C_{subblock}^{TC} - D)$ dummy bits are padded such that $y_k =$ TABLE 4-continued <NULL> for k = 0, 1, . . . , $N_D$-1. Then, $y_{N_D+k} = d_k^{(i)}$, k = 0, 1, . . . , D-1, and the bit sequence $y_k$ is written into the ($R_{subblock}^{TC} \times C_{subblock}^{TC}$) matrix row by row starting with bit $y_0$ in column 0 of row 0:

$$\begin{bmatrix} y_0 & y_1 & y_2 & \cdots & y_{C_{subblock}^{TC}-1} \\ y_{C_{subblock}^{TC}} & y_{C_{subblock}^{TC}+1} & y_{C_{subblock}^{TC}+2} & \cdots & y_{2C_{subblock}^{TC}-1} \\ \vdots & \vdots & \vdots & \ddots & \vdots \\ y_{(R_{subblock}^{TC}-1)\times C_{subblock}^{TC}} & y_{(R_{subblock}^{TC}-1)\times C_{subblock}^{TC}+1} & y_{(R_{subblock}^{TC}-1)\times C_{subblock}^{TC}+2} & \cdots & y_{(R_{subblock}^{TC}\times C_{subblock}^{TC}-1)} \end{bmatrix}$$

For $d_k^{(0)}$ and $d_k^{(1)}$:
(4) Perform the inter-column permutation for the matrix based on the patter $(P(j))_{j \in \{0,1,\ldots,C_{subblock}^{TC}-1\}}$ that is shown in table 3, where P(j) is the original column position of the j-th permuted column.
After permutation of the columns, the inter-column permuted ($R_{subblock}^{TC} \times C_{subblock}^{TC}$) matrix is equal to $$\begin{bmatrix} y_{P(0)} & y_{P(1)} & y_{P(2)} & \cdots & y_{P(C_{subblock}^{TC}-1)} \\ y_{P(0)+C_{subblock}^{TC}} & y_{P(1)+C_{subblock}^{TC}} & y_{P(2)+C_{subblock}^{TC}} & \cdots & y_{P(C_{subblock}^{TC}-1)+C_{subblock}^{TC}} \\ \vdots & \vdots & \vdots & \ddots & \vdots \\ y_{P(0)+(R_{subblock}^{TC}-1)\times C_{subblock}^{TC}} & y_{P(1)+(R_{subblock}^{TC}-1)\times C_{subblock}^{TC}} & y_{P(2)+(R_{subblock}^{TC}-1)\times C_{subblock}^{TC}} & \cdots & y_{P(C_{subblock}^{TC}-1)+(R_{subblock}^{TC}-1)\times C_{subblock}^{TC}} \end{bmatrix}$$

(5) The output of the block interleaver is the bit sequence read out column by column from the inter-column permuted ($R_{subblock}^{TC} \times C_{subblock}^{TC}$) matrix. The bits after sub-block interleaving are denoted by $v_0^{(i)}, v_1^{(i)}, v_2^{(i)}, \ldots v_{K_\Pi-1}^{(i)}$, where $v_0^{(i)}$ corresponds to $y_{P(0)}$, $v_1^{(i)}$ to $y_{P(0)+C_{subblock}^{TC}}$ . . . and $K_\Pi = (R_{subblock}^{TC} \times C_{subblock}^{TC})$.
For $d_k^{(2)}$:
(4) The output of the sub-block interleaver is denoted by $v_0^{(2)}, v_1^{(2)}, v_2^{(2)}, \ldots, v_{K_\Pi-1}^{(2)}$, where $v_k^{(2)} = y_{\pi(k)}$ and where $$\pi(k) = \left( P\left( \left\lfloor \frac{k}{R_{subblock}^{TC}} \right\rfloor \right) + C_{subblock}^{TC} \times (k \bmod R_{subblock}^{TC}) + 1 \right) \bmod K_\Pi$$

Bit Collection, Selection and Transmission

Table 5 shows a specific description of bit collection, selection and transmission.

TABLE 5

The circular of buffer length $K_w = 3K_\Pi$ for the r-th coded block is generated as follows:
    $w_k = v_k^{(0)}$ for k = 0, . . . , $K_\Pi$-1
    $w_{K_\Pi+2k} = v_k^{(1)}$ for k = 0, . . . , $K_\Pi$-1
    $w_{K_\Pi+2k+1} = v_k^{(2)}$ for k = 0, . . . , $K_\Pi$-1
Denote the soft buffer size for the transport block by $N_{IR}$ bits and the soft buffer size for the r-th block by $N_{cb}$ bits. The size $N_{cb}$ is obtained as
follows, where C is the number of code blocks computed in section 5.1.2:

$$N_{cb} = \min\left( \left\lfloor \frac{N_{IR}}{C} \right\rfloor, K_w \right) \text{ for DL-SCH transport channels}$$

$N_{cb} = K_w$ for UL-SCH transport channels
where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:
$N_{soft}$ is the total number of soft channel bits [FFS].
$K_{MIMO}$ is equal to 2 if [FFS condition], and is equal to 1 otherwise.
$M_{DL\_HARQ}$ is the maximum number of DL HARQ processes as defined in section 7 of [3].
$M_{limit}$ is a constant equal to [FFS].
Denoting by E the rate matching output sequence length for the r-th coded block, and $rv_{idx}$ the redundancy version number for this transmission ($rv_{idx}$ = 0, 1, 2 or 3), the rate matching output bit sequence is $e_k$, k = 0, 1, . . . , E-1.
Define by G the total number of bits available for the transmission of one transport block.

TABLE 5-continued

Set G' = G/($N_L \cdot Q_m$) where $Q_m$ is equal to 2 for QPSK, 4 for 16QAM, 6 for 64QAM, and where
  For transmit diversity:
    $N_L$ is equal to 2,
  Otherwise:
    $N_L$ is equal to the number of layers a transport block is mapped onto
Set $\gamma$ = G' mod C, where C is the number of code blocks computed in section 5.1.2.
if r ≤ C-$\gamma$-1
  set E = $N_L \cdot Q_m \cdot \lfloor G'/C \rfloor$
else
  set E = $N_L \cdot Q_m \cdot \lceil G'/C \rceil$
end if $$\text{Set } k_0 = R_{subblock}^{TC} \cdot \left( 2 \cdot \left\lceil \frac{N_{cb}}{8 R_{subblock}^{TC}} \right\rceil \cdot rv_{idx} + 2 \right),$$

where $R_{subblock}^{TC}$ is the number of rows defined in section 5.1.4.1.1.
Set k = 0 and j = 0
while {k < E}
  if $W_{(k_0+j) \bmod N_{cb}} \neq$ <NULL>
    $e_k = w_{(k_0+j) \bmod N_{cb}}$
    k = k + 1
  end if
  j = j + 1
end while LDPC Coding Table 6 below shows a description of LDPC coding.

TABLE 6

The K bits including filler bits ($c_0, c_1, c_2, \ldots, c_{K-1}$) are encoded based on D-K by D parity check matrix (H), where D is number of encoded bits and D-K is the number of parity check bits. The parity check bits ($p_0, p_1, p_2, \ldots, p_{D-K-1}$) are obtained so that $H \cdot d^T = 0$, where $d = (c_0, c_1, c_2, \ldots, c_{K-1}, p_0, p_1, p_2, \ldots, p_{D-K-1})$ is coded bits stream.
The parity check matrix H is defined as:

$$H = \begin{bmatrix} P^{a_{0,0}} & P^{a_{0,1}} & P^{a_{0,2}} & \cdots & P^{a_{0,N_{ldpc\_b}-2}} & P^{a_{0,N_{ldpc\_b}-1}} \\ P^{a_{1,0}} & P^{a_{1,1}} & P^{a_{1,2}} & & P^{a_{1,N_{ldpc\_b}-2}} & P^{a_{1,N_{ldpc\_b}-1}} \\ P^{a_{2,0}} & P^{a_{2,1}} & P^{a_{2,2}} & \cdots & P^{a_{2,N_{ldpc\_b}-2}} & P^{a_{2,N_{ldpc\_b}-1}} \\ \vdots & & & \ddots & & \vdots \\ P^{a_{N_{parity\_b}-1,0}} & P^{a_{N_{parity\_b}-1,1}} & P^{a_{N_{parity\_b}-1,2}} & \cdots & P^{a_{N_{parity\_b}-1,N_{ldpc\_b}-2}} & P^{a_{N_{parity\_b}-1,N_{ldpc\_b}-1}} \end{bmatrix}$$

where $P^{a_{ij}}$ ($0 \leq i < N_{parity\_b}$, $0 \leq j < N_{ldpc\_b}$) is zero matrix (when $a_{ij} = -1$) or cyclic-permutation matrix obtained from the Z by Z identity matrix by cyclically shifted the columns to the right by $a_{ij}$ elements. The value of Z is shift size obtained by $Z = \lceil K/K_{min} \rceil \cdot 27$ where $K_{min}$ is given in Table 5.1.2-1.
The matrix $P^{a_{ij}}$ is Z by Z zero matrix when $a_{ij}$ is -1. The codeword length D, information length K and number of parity bits D-K is equal to $N_{ldpc\_b} \times Z$, $K_{ldpc\_b} \times Z$ and $N_{parity\_b} \times Z$, respectively. The parameters $N_{ldpc\_b}$, $K_{ldpc\_b}$ and $N_{parity\_b}$ according to code rates are depicted in Table 3.
The parity check matrix is obtained based on Tables 5.1.3.2-2, 5.1.3.2-3, 5.1.3.2-4 and 5.1.3.2-5 which show the exponents ($a_{ij}$) of parity check matrix when the code rate equals 5/6, 3/4, 2/3 and 1/2 for each encoded bits, respectively [5].

Table 7 below shows the parameters of the parity check matrix.

TABLE 7

| Code Rate | $N_{ldpc\_b}$ | $K_{ldpc\_b}$ | $N_{parity\_b}$ |
|---|---|---|---|
| 5/6 | 24 | 20 | 4 |
| 3/4 | 24 | 18 | 6 |
| 2/3 | 24 | 16 | 8 |
| 1/2 | 24 | 12 | 12 |

TABLE 8

Matrix exponents for Code rate R = 5/6

(a) D = 648 bits, Z = 27 bits

| 16 | 17 | 22 | 24 | 9 | 3 | 14 | -1 | 4 | 2 | 7 | -1 |
| 26 | -1 | 2 | -1 | 21 | -1 | 1 | 0 | -1 | -1 | -1 | -1 |
| 25 | 12 | 12 | 3 | 3 | 26 | 6 | 21 | -1 | 15 | 22 | -1 |
| 15 | -1 | 4 | -1 | -1 | 16 | -1 | 0 | 0 | -1 | -1 | -1 |
| 25 | 18 | 26 | 16 | 22 | 23 | 9 | -1 | 0 | -1 | 4 | -1 |
| 4 | -1 | 8 | 23 | 11 | -1 | -1 | -1 | 0 | 0 | -1 | -1 |
| 9 | 7 | 0 | 1 | 17 | -1 | -1 | 7 | 3 | -1 | 3 | 23 |
| -1 | 16 | -1 | -1 | 21 | -1 | 0 | -1 | -1 | 0 | 0 | -1 |
| 24 | 5 | 26 | 7 | 1 | -1 | -1 | 15 | 24 | 15 | -1 | 8 |
| -1 | 13 | -1 | 13 | -1 | 11 | -1 | -1 | -1 | -1 | 0 | 0 |
| 2 | 2 | 19 | 14 | 24 | 1 | 15 | 19 | -1 | 21 | -1 | 2 |
| -1 | 24 | -1 | 3 | -1 | 2 | 1 | -1 | -1 | -1 | -1 | 0 |

(b) D = 1296 bits, Z = 54 bits

| 39 | 40 | 51 | 41 | 3 | 29 | 8 | 36 | -1 | 14 | -1 | 6 |
| -1 | 33 | -1 | 11 | -1 | 4 | 1 | 0 | -1 | -1 | -1 | -1 |

TABLE 8-continued

Matrix exponents for Code rate R = 5/6

| 48 | 21 | 47 | 9 | 48 | 35 | 51 | -1 | 38 | -1 | 28 | -1 |
| 34 | -1 | 50 | -1 | 50 | -1 | -1 | 0 | 0 | -1 | -1 | -1 |
| 30 | 39 | 28 | 42 | 50 | 39 | 5 | 17 | -1 | 6 | -1 | 18 |
| -1 | 20 | -1 | 15 | -1 | 40 | -1 | -1 | 0 | 0 | -1 | -1 |
| 29 | 0 | 1 | 43 | 36 | 30 | 47 | -1 | 49 | -1 | 47 | -1 |
| 3 | -1 | 35 | -1 | 34 | -1 | 0 | -1 | -1 | 0 | 0 | -1 |
| 1 | 32 | 11 | 23 | 10 | 44 | 12 | 7 | -1 | 48 | -1 | 4 |
| -1 | 9 | -1 | 17 | -1 | 16 | -1 | -1 | -1 | -1 | 0 | 0 |
| 13 | 7 | 15 | 47 | 23 | 16 | 47 | -1 | 43 | -1 | 29 | -1 |
| 52 | -1 | 2 | -1 | 53 | -1 | 1 | -1 | -1 | -1 | -1 | 0 |

(c) D = 1944 bits, Z = 81 bits

| 48 | 29 | 28 | 39 | 9 | 61 | -1 | -1 | -1 | 63 | 45 | 80 |
| -1 | -1 | -1 | 37 | 32 | 22 | 1 | 0 | -1 | -1 | -1 | -1 |
| 4 | 49 | 42 | 48 | 11 | 30 | -1 | -1 | -1 | 49 | 17 | 41 |
| 37 | 15 | -1 | 54 | -1 | -1 | -1 | -1 | 0 | 0 | -1 | -1 |
| 35 | 76 | 78 | 51 | 37 | 35 | 21 | -1 | 17 | 64 | -1 | -1 |
| -1 | 59 | 7 | -1 | -1 | 32 | -1 | -1 | -1 | 0 | 0 | -1 |
| 9 | 65 | 44 | 9 | 54 | 56 | 73 | 34 | 42 | -1 | -1 | -1 |
| 35 | -1 | -1 | -1 | 46 | 39 | 0 | -1 | -1 | -1 | 0 | 0 |
| 3 | 62 | 7 | 80 | 68 | 26 | -1 | 80 | 55 | -1 | 36 | -1 |
| 26 | -1 | 9 | -1 | 72 | -1 | -1 | -1 | -1 | -1 | -1 | 0 |
| 26 | 75 | 33 | 21 | 69 | 59 | 3 | 38 | -1 | -1 | -1 | 35 |
| -1 | 62 | 36 | 26 | -1 | -1 | 1 | -1 | -1 | -1 | -1 | 0 |

TABLE 9

Matrix exponents for R = 3/4

(a) D = 648 bits, Z = 27 bits

```
16 17 22 24  9  3 14 -1  4  2  7 -1 -1 26 -1  2 -1 21 -1  1  0 -1 -1 -1
25 12 12  3  3 26  6 21 -1 15 22 -1 -1 15 -1  4 -1 -1 16 -1  0  0 -1 -1
25 18 26 16 22 23  9 -1  0 -1  4 -1 -1  4 -1  8 23 11 -1 -1 -1 -1  0 -1
 9  7  0  1 17 -1 -1  7  3 -1  3 23 -1 16 -1 -1 21 -1  0 -1 -1  0  0 -1
24  5 26  7  1 -1 -1 15 24 15 -1  8 -1 13 -1 13 -1 11 -1 -1 -1 -1 -1  0
 2  2 19 14 24  1 15 19 -1 21 -1  2 -1 24 -1  3 -1  2  1 -1 -1 -1 -1 -1
                                                                      0
```

(b) D = 1296 bits, Z = 54 bits

```
39 40 51 41  3 29  8 36 -1 14 -1  6 -1 33 -1 11 -1  4  1  0 -1 -1 -1 -1
48 21 47  9 48 35 51 -1 38 -1 28 -1 34 -1 50 -1 50 -1 -1  0  0 -1 -1 -1
30 39 28 42 50 39  5 17 -1  6 -1 18 -1 20 -1 15 -1 40 -1 -1  0  0 -1 -1
29  0  1 43 36 30 47 -1 49 -1 47 -1  3 -1 35 -1 34 -1  0 -1 -1  0  0 -1
 1 32 11 23 10 44 12  7 -1 48 -1  4 -1  9 -1 17 -1 16 -1 -1 -1 -1  0  0
13  7 15 47 23 16 47 -1 43 -1 29 -1 52 -1  2 -1 53 -1  1 -1 -1 -1 -1  0
```

(c) D = 1944 bits, Z = 81 bits

```
48 29 28 39  9 61 -1 -1 -1 63 45 80 -1 -1 -1 37 32 22  1  0 -1 -1 -1 -1
 4 49 42 48 11 30 -1 -1 -1 49 17 41 37 15 -1 54 -1 -1 -1 -1  0  0 -1 -1
35 76 78 51 37 35 21 -1 17 64 -1 -1 -1 59  7 -1 -1 32 -1 -1  0  0 -1 -1 -1
 9 65 44  9 54 56 73 34 42 -1 -1 -1 35 -1 -1 -1 46 39  0 -1 -1  0  0 -1
 3 62  7 80 68 26 -1 80 55 -1 36 -1 26 -1  9 -1 72 -1 -1 -1 -1 -1  0  0
26 75 33 21 69 59  3 38 -1 -1 -1 35 -1 62 36 26 -1 -1  1 -1 -1 -1 -1  0
```

TABLE 10

Matrix exponents for Code rate R = 2/3

(a) D = 648 bits, Z = 27 bits

```
25 26 14 -1 20 -1  2 -1  4 -1 -1  8 -1 16 -1 18  1  0 -1 -1 -1 -1 -1 -1
10  9 15 11 -1  0 -1  1 -1 -1 18 -1  8 -1 10 -1 -1  0  0 -1 -1 -1 -1 -1
16  2 20 26 21 -1  6 -1  1 26 -1  7 -1 -1 -1 -1 -1 -1  0  0 -1 -1 -1 -1
10 13  5  0 -1  3 -1  7 -1 -1 26 -1 -1 13 -1 16 -1 -1 -1 -1  0  0 -1 -1
23 14 24 -1 12 -1 19 -1 17 -1 -1 -1 20 -1 21 -1  0 -1 -1 -1 -1  0  0 -1
 6 22  9 20 -1 25 -1 17 -1  8 -1 14 -1 18 -1 -1 -1 -1 -1 -1 -1 -1  0  0
14 23 21 11 20 -1 24 -1 18 -1 19 -1 -1 -1 -1 22 -1 -1 -1 -1  0 -1 -1 -1
                                                                      0
17 11 11 20 -1 21 -1 26 -1  3 -1 -1 18 -1 26 -1  1 -1 -1 -1 -1 -1 -1 -1
                                                                      0
```

(b) D = 1296 bits, Z = 54 bits

```
39 31 22 43 -1 40  4 -1 11 -1 -1 50 -1 -1 -1  6  1  0 -1 -1 -1 -1 -1 -1
25 52 41  2  6 -1 14 -1 34 -1 -1 -1 24 -1 37 -1 -1  0  0 -1 -1 -1 -1 -1
43 31 29  0 21 -1 28 -1 -1  2 -1 -1  7 -1 17 -1 -1 -1  0  0 -1 -1 -1 -1
20 33 48 -1  4 13 -1 26 -1 -1 22 -1 -1 46 42 -1 -1 -1 -1 -1  0  0 -1 -1
45  7 18 51 12 25 -1 -1 -1 50 -1 -1  5 -1 -1 -1  0 -1 -1 -1 -1  0  0 -1
35 40 32 16  5 -1 -1 18 -1 -1 43 51 -1 32 -1 -1 -1 -1 -1 -1 -1 -1  0  0
 9 24 13 22 28 -1 -1 37 -1 -1 25 -1 -1 52 -1 13 -1 -1 -1 -1 -1 -1 -1  0
32 22  4 21 16 -1 -1 -1 27 28 -1 38 -1 -1 -1  8  1 -1 -1 -1 -1 -1 -1 -1
                                                                      0
```

(c) D = 1944 bits, Z = 81 bits

```
61 75  4 63 56 -1 -1 -1 -1 -1  8 -1  2 17 25  1  0 -1 -1 -1 -1 -1 -1 -1
56 74 77 20 -1 -1 -1 64 24  4 67 -1  7 -1 -1 -1 -1  0  0 -1 -1 -1 -1 -1
28 21 68 10  7 14 65 -1 -1 -1 23 -1 -1 -1 75 -1 -1 -1  0  0 -1 -1 -1 -1
48 38 43 78 76 -1 -1 -1  5 36 -1 15 72 -1 -1 -1 -1 -1 -1 -1  0  0 -1 -1
40  2 53 25 -1 52 62 -1 20 -1 -1 44 -1 -1 -1 -1  0 -1 -1 -1 -1  0  0 -1
69 23 64 10 22 -1 21 -1 -1 -1 -1 -1 68 23 29 -1 -1 -1 -1 -1 -1 -1  0  0
12  0 68 20 55 61 -1 40 -1 -1 -1 52 -1 -1 -1 44 -1 -1 -1 -1 -1 -1 -1  0
58  8 34 64 78 -1 -1 11 78 24 -1 -1 -1 -1 -1 58  1 -1 -1 -1 -1 -1 -1 -1
                                                                      0
```

TABLE 11

Matrix exponents for Code rate R = 1/2

(a) D = 648 bits, Z = 27 bits

```
 0 -1 -1 -1  0  0 -1 -1  0 -1 -1  0   1  0 -1 -1 -1 -1 -1 -1 -1 -1 -1 -1
22  0 -1 -1 17 -1  0  0 12 -1 -1 -1  -1  0  0 -1 -1 -1 -1 -1 -1 -1 -1 -1
 6 -1  0 -1 10 -1 -1 -1 24 -1  0 -1  -1 -1  0  0 -1 -1 -1 -1 -1 -1 -1 -1
 2 -1 -1  0 20 -1 -1 -1 25  0 -1 -1  -1 -1 -1  0  0 -1 -1 -1 -1 -1 -1 -1
23 -1 -1 -1  3 -1 -1 -1  0 -1  9 11  -1 -1 -1 -1  0  0 -1 -1 -1 -1 -1 -1
24 -1 23  1 17 -1  3 -1 10 -1 -1 -1  -1 -1 -1 -1 -1  0  0 -1 -1 -1 -1 -1
25 -1 -1 -1  8 -1 -1 -1  7 18 -1 -1   0 -1 -1 -1 -1 -1  0  0 -1 -1 -1 -1
13 24 -1 -1  0 -1  8 -1  6 -1 -1 -1  -1 -1 -1 -1 -1 -1 -1  0  0 -1 -1 -1
 7 20 -1 16 22 10 -1 -1 23 -1 -1 -1  -1 -1 -1 -1 -1 -1 -1 -1  0  0 -1 -1
11 -1 -1 -1 19 -1 -1 -1 13 -1  3 17  -1 -1 -1 -1 -1 -1 -1 -1 -1  0  0 -1
25 -1  8 -1 23 18 -1 14  9 -1 -1 -1  -1 -1 -1 -1 -1 -1 -1 -1 -1 -1  0  0
 3 -1 -1 -1 16 -1 -1  2 25  5 -1 -1   1 -1 -1 -1 -1 -1 -1 -1 -1 -1 -1  0
```

(b) D = 1296 bits, Z = 54 bits

```
40 -1 -1 -1 22 -1 49 23 43 -1 -1 -1   1  0 -1 -1 -1 -1 -1 -1 -1 -1 -1 -1
50  1 -1 -1 48 35 -1 -1 13 -1 30 -1  -1  0  0 -1 -1 -1 -1 -1 -1 -1 -1 -1
39 50 -1 -1  4 -1  2 -1 -1 -1 -1 49  -1 -1  0  0 -1 -1 -1 -1 -1 -1 -1 -1
33 -1 -1 38 37 -1 -1  4  1 -1 -1 -1  -1 -1 -1  0  0 -1 -1 -1 -1 -1 -1 -1
45 -1 -1 -1  0 22 -1 -1 20 42 -1 -1  -1 -1 -1 -1  0  0 -1 -1 -1 -1 -1 -1
51 -1 -1 48 35 -1 -1 -1 44 -1 18 -1   0  0 -1 -1 -1  0  0 -1 -1 -1 -1 -1
47 11 -1 -1 -1 17 -1 -1 51 -1 -1 -1   0  0 -1 -1 -1 -1  0  0 -1 -1 -1 -1
 5 -1 25 -1  6 -1 45 -1 13 40 -1 -1  -1 -1 -1 -1 -1  0  0 -1 -1  0 -1 -1
33 -1 -1 34 24 -1 -1 -1 23 -1 -1 46  -1 -1 -1 -1 -1 -1 -1  0  0 -1 -1 -1
 1 -1 27 -1  1 -1 -1 -1 38 -1 44 -1  -1 -1 -1 -1 -1 -1 -1 -1  0  0 -1 -1
-1 18 -1 -1 23 -1 -1  8  0 35 -1 -1  -1 -1 -1 -1 -1 -1 -1 -1 -1  0  0  0
49 -1 17 -1 30 -1 -1 -1 34 -1 -1 19   1 -1 -1 -1 -1 -1 -1 -1 -1 -1 -1  0
```

(c) D = 1944 bits, Z = 81 bits

```
57 -1 -1 -1 50 -1 11 -1 50 -1 79 -1   1  0 -1 -1 -1 -1 -1 -1 -1 -1 -1 -1
 3 -1 28 -1  0 -1 -1 -1 55  7 -1 -1  -1  0  0 -1 -1 -1 -1 -1 -1 -1 -1 -1
30 -1 -1 -1 24 37 -1 -1 56 14 -1 -1  -1 -1  0  0 -1 -1 -1 -1 -1 -1 -1 -1
62 53 -1 -1 53 -1 -1  3 35 -1 -1 -1  -1 -1 -1  0  0 -1 -1 -1 -1 -1 -1 -1
40 -1 -1 20 66 -1 -1 22 28 -1 -1 -1  -1 -1 -1 -1  0  0 -1 -1 -1 -1 -1 -1
 0 -1 -1 -1  8 -1 42 -1 50 -1 -1  8  -1 -1 -1 -1 -1  0  0 -1 -1 -1 -1 -1
69 79 79 -1 -1 -1 56 -1 52 -1 -1 -1   0 -1 -1 -1 -1 -1  0  0 -1 -1 -1 -1
65 -1 -1 -1 38 57 -1 -1 72 -1 27 -1  -1 -1 -1 -1 -1 -1 -1  0  0 -1 -1 -1
64 -1 -1 -1 14 52 -1 -1 30 -1 -1 32  -1 -1 -1 -1 -1 -1 -1 -1  0  0 -1 -1
-1 45 -1 70  0 -1 -1 -1 77  9 -1 -1  -1 -1 -1 -1 -1 -1 -1 -1 -1  0  0 -1
 2 56 -1 57 35 -1 -1 -1 -1 -1 12 -1  -1 -1 -1 -1 -1 -1 -1 -1 -1 -1  0  0
24 -1 61 -1 60 -1 -1 27 51 -1 -1 16   1 -1 -1 -1 -1 -1 -1 -1 -1 -1 -1  0
```

When an LDPC code is introduced, if an encoder is designed without a restriction on a payload size, it is unable to satisfy required performance due to such a restriction as processing capability of a receiver, performance gain, decoding latency, and the like. Hence, it may be efficient to perform encoding in a manner of segmenting a payload size equal to or greater than a specific threshold value into a plurality of code blocks less than the threshold value.

As mentioned in the foregoing description, an LDPC encoder may be defined by a parity check matrix (H). In other words, H matrix can be defined for an information bit length D and a coding rate r. Since the encoded bit length D is defined by 648, 1296, and 1944 bits and the coding rate (=payload size/codeword size) is defined by 5/6, 3/4, 2/3, and 1/2, 12 H matrixes are defined by a combination of (D, r). A payload size K supported by the 12 H matrixes can be calculated by an equation of D*r and supports payload sizes of {324, 432, 486, 540, 648, 864, 972, 989, 1080, 1319, 1484, 1648} bits. LDPC coding for an undefined encoded bit length can be supported using such a method as shortening and puncturing. For example, in case of performing 1/2 LDPC encoding on a payload size of 600 bits, the D becomes 1200 bits. In this case, since the r corresponds to 1/2, H matrix of a combination of (1296, 1/2) is used. In this case, if 48 bits among information bit 648 bits are set to 0, since it is a systematic structure, 48 bits of encoded bits become 0 and puncturing is performed on 48 bits among the remaining 1248 bits to generate 1200 bits.

Figure 10:
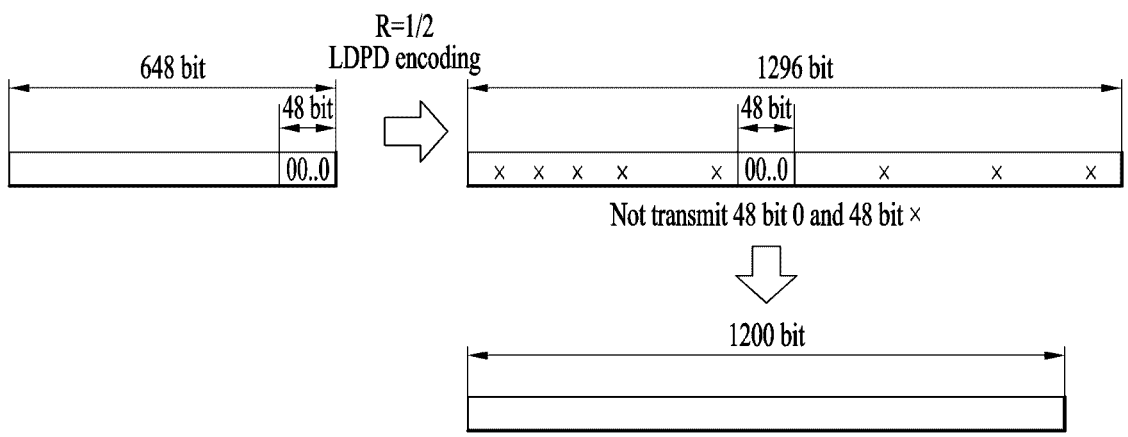
FIG. 10 illustrates an example of supporting various payload sizes using shortening/puncturing.

FIG. 10 illustrates an example of supporting various payload sizes using shortening/puncturing.

As mentioned in the foregoing description, if M (=M1× M2) number of H matrixes is defined, it indicates that M number of (D, r) or (K, r) combinations is supported. In order to support other code rates and payload sizes, it is necessary to perform a rate matching procedure such as shortening/puncturing/repetition. In this case, assume that D or K and r supports M1 number of H matrixes and M2 number of H matrixes, respectively. When the finite number of H matrixes is defined, the present invention proposes a method of segmenting a payload size greater than a specific threshold into a plurality of code blocks. After the code block segmentation is performed, a CRC can be attached to a code block. In general, since encoding is performed in a code block unit, it is preferable to have the same code block size. Yet, in case of performing shortening/puncturing/repetition, since it may have considerable performance deterioration, it may be able to perform code block segmentation using different code block sizes.

Figure 11:
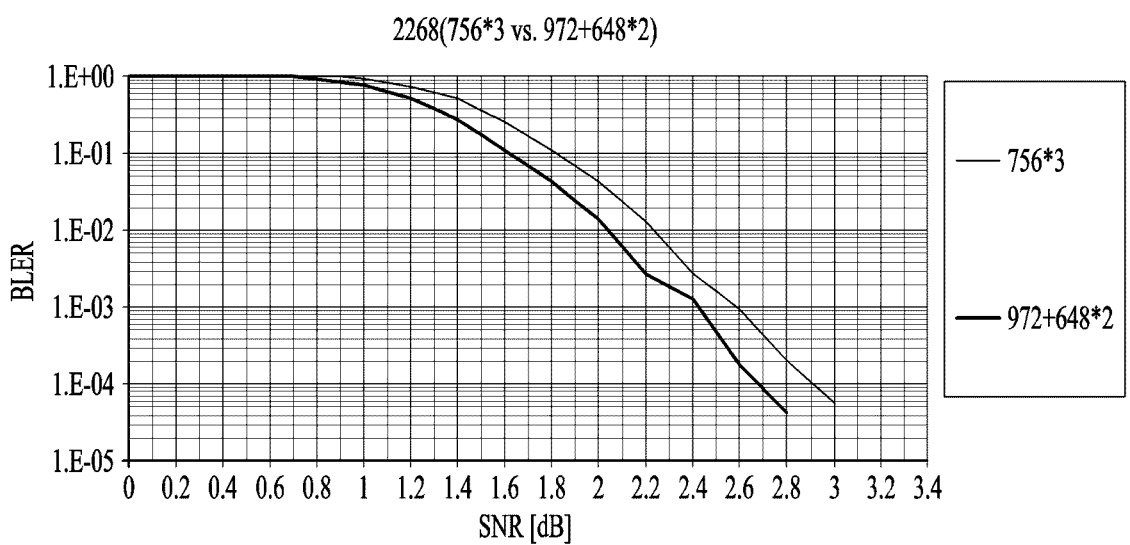
FIG. 11 illustrates performance comparison between segmentation using the same code block and segmentation using a different code block for an LDPC encoder.

FIG. 11 illustrates performance comparison between segmentation using the same code block size and segmentation using different code block sizes for an LDPC encoder.

In this case, assume that a payload size is 2268 bits under the assumption that code block segmentation is performed when a payload size is equal to or greater than 1648 bits. The 2268 bits can be segmented into 3 code blocks of the same size (756 bits) or can be segmented into 1 code block of a payload size of 972 bits and 2 code blocks of a payload size of 648 bits. In this case, the 756 bits can be encoded via shortening while using H matrix for the 972 bits. As shown in FIG. 11, when segmentation is performed with a code block size among payload sizes supporting H matrix, it may have good performance. It may consider a code block segmentation scheme described in the following based on the performance result shown in FIG. 11.

It is preferable that segmentation is performed to minimize the number of segmented code blocks.

(1) As a length of a code block is longer, performance is better. Hence, segmentation is performed to make a code block length to be maximized. (2) Since a CB CRC is attached to every code block, overhead can be increased (e.g., LTE Turbo code). Yet, in case of using an LDPC code, the CB CRC can be replaced with a syndrome check.

It is preferable to perform segmentation using a payload size supported by H matrix. In this case, the H matrix may vary depending on a code rate. Hence, when code block segmentation is performed, it is preferable to consider a code rate capable of being obtained from control information. When a code rate $r_t$ used for actual transmission satisfies $r_n \leq r_t < r_{n+1}$, n=1, ..., M2 $r_n \leq r_t < r_{n+1}$, n=1, ..., M2, it is preferable to perform segmentation using a payload size supported by H matrix corresponding to a code rate selected from among $r_n$, $r_{n+1} r_n$, $r_{n+1}$ based on a specific reference.

Segmentation is performed using the same code block size supported by H matrix. When a payload (=transport block) size is defined, it may be able to define a code block of a size supported by H matrix. It may be able to represent as $K+CRC_{TB}=N*(K_n+CRC_{CB})$, n=1, ..., M. In this case, $CRC_{TB}$ and $CRC_{CB}$ correspond to a CRC length attached to a transport block and a CRC length attached a code block, respectively. N corresponds to the number of segmented code blocks. If multiple Z's are supported, K may be determined such that $K+CRC_{TB}=K_{ldpc}*Z=N*(K_n+CRC_{CB})$, where $K_{ldpc}$ is the base matrix, and $K_n$ is the code block size supported by the existing H matrix when n=1, ..., M.

When segmentation is performed using the same code block size, in case of a payload size not supported by H matrix, the segmentation can be performed using different code block sizes supported by the H matrix. In this case, it is preferable to minimize the number of code blocks of the different size. For example, the number can be restricted to 2 or 3. When a payload (=transport block) size is defined, it may be able to define the sum of code blocks of different sizes supported by H matrix. In this case, it may be able to represent as $K+CRC_{TB}=N1*(K_{n1}+CRC_{CB})+N2*(K_{n2}+CRC_{CB})$, n1, n2=1, ..., M in consideration of 2 code blocks of a different size. In this case, $CRC_{TB}$ and $CRC_{CB}$ correspond to a CRC length attached to a transport block and a CRC length attached to a code block, respectively. N1 and N2 correspond to the number of code blocks segmented by a size of Kn1 and the number of code blocks segmented by a size of Kn2, respectively.

When segmentation is not performed using different payload sizes supported by H matrix, the segmentation is performed using a code block corresponding to the sum of sizes of segmented code blocks closest to a payload size. In this case, number of payload bits corresponding to a difference between the sum of size of segmented code blocks and the payload size can be processed as follows.

Method 1: the payload bits are allocated to a specific code block and a codeword length is matched by performing rate matching such as shortening/puncturing/repetition. Method 1-1: When segmentation is performed using code blocks of different sizes, the payload bits are allocated to a code block among code blocks corresponding to a specific code block size. Method 1-2: When segmentation is performed using code blocks of different sizes, the payload bits are evenly allocated to all code blocks corresponding to a specific code block size.

Method 2: The payload bits are evenly allocated to all code blocks and a codeword length is matched by performing rate matching such as shortening/puncturing/repetition. Method 2-1: The number of bits, which is allocated per a code block, is allocated in proportion to the number of code blocks and each bit is allocated to a specific code block of each code block size. Method 2-2: The number of bits, which is allocated according to a code block, is allocated in proportion to the number of code blocks and bits, which are allocated to code blocks of each code block size, are evenly allocated.

Method for Determining Code Block Size Supported by H Matrix

When puncturing is not assumed, the code block size may be represented as $Z*K_{ldpc}$ (including CRC length). When various values of Z are designed, the code block size may also have various values. In addition, with shortening, the granularity of the code block size may be more diversified. However, if shortening is excessively allowed, performance may be degraded. Accordingly, the shortening may be limited to be less than or equal to a certain value. For example, the amount of shortening may be limited to a multiple of a specific Z value, X*Z (e.g., X=6), or less. This may be determined considering the degree of performance degradation and the granularity of the supported code block size. Shortening may be performed on a 1-bit basis. However, if the code block size is defined on the 1-bit basis, the number of code block sizes will increase, resulting in increase in costs for test of the UE. Therefore, the amount of shortening allowed for evenly spaced code block sizes may be limited. When a set of supported values of Z is {Z1, Z2, Z3, ..., Zn}, it is assumed that the relationship of Z1>Z2>...>Zn is established. In this case, when the constant c is specified and shortening of Z1*c, Z1*(2c), Z1*(3 c), ... is allowed, the code block sizes are $Z1*Z*K_{ldpc}$, $Z1*K_{ldpc}-Z1*C$, $Z1*K_{ldpc}-Z1*(2c)$, $Z1*K_{ldpc}-Z1*(3c)$, and the like. Here, the shortening may be limited so as to be less than X*Z1, and m may be selected so as to satisfy the relationship of $Z1*K_{ldpc}-Z1*(mc)>Z2*K_{ldpc}$. The same principle may also be applied to {Zn} where n>1.

Table 12 below shows an example of code block sizes supported when $K_{ldpc}=32$, the set of values of Z is {256, 224, 192, 160, 128, 112, 96, 80, 64, 56, 48, 40, 32, 28, 24, 20, 16, 14, 12, 10, 8, 6, 4}, the maximum code block size is 819, and c=0.5.

TABLE 12

Example of code block sizes ($K_{ldpc}$ = 32, the set of Z: {256, 224, 192, 160, 128, 112, 96, 80, 64, 56, 48, 40, 32, 28, 24, 20, 16, 14, 12, 10, 8, 6, 4}, maximum code block size = 8192, c = 0.5)

| Z | Code block size |
|---|---|
| 256 | 8192, 8064, 7936, 7808, 7680, 7552, 7424, 7296 |
| 224 | 7168, 7056, 6944, 6832, 6720, 6608, 6496, 6384, 6272, [6160] |
| 192 | 6144, 5952, 5856, 5760, 5664, 5568, 5472, 5376, 5280, 5184 |
| 160 | 5120, 5040, 4960, 4880, 4800, 4720, 4640, 4560, 4480, 4400, 4320, 4240, 4160 |
| 128 | 4096, 4032, 3968, 3904, 3840, 3776, 3712, 3648 |
| 112 | 3584, 3528, 3472, 3416, 3360, 3304, 3248, 3192, 3136 |
| 96 | 3072, 3024, 2976, 2928, 2880, 2832, 2784, 2736, 2688, 2640, 2592 |
| 80 | 2560, 2520, 2480, 2440, 2400, 2360, 2320, 2280, 2240, 2200, 2160, 2120, 2080 |
| 64 | 2048, 2016, 1984, 1952, 1920, 1888, 1856, 1824 |
| 56 | 1792, 1764, 1736, 1708, 1680, 1652, 1624, 1596, 1568, [1540] |
| 48 | 1536, 1512, 1488, 1464, 1440, 1416, 1392, 1368, 1344, 1320, 1296 |
| 40 | 1280, 1260, 1240, 1220, 1200, 1180, 1160, 1140, 1120, 1100, 1080, 1060, 1040 |
| 32 | 1024, 1008, 992, 976, 960, 944, 928, 912 |
| 28 | 896, 882, 868, 854, 840, 826, 812, 798, 784, [770] |
| 24 | 768, 756, 744, 732, 720, 708, 696, 684, 672, 660 |
| 20 | 640, 630, 620, 610, 600, 590, 580, 570, 560, 550, 540, 530, 520 |
| 16 | 512, 504, 496, 488, 480, 472, 464, 456 |
| 14 | 448, 441, 434, 427, 420, 413, 406, 399, 392, [385] |
| 12 | 384, 378, 372, 366, 360, 354, 348, 342, 336, 330, [324] |
| 10 | 320, 315, 310, 305, 300, 295, 290, 285, 280, 275, 270, 265, 260 |
| 8 | 256, 252, 248, 244, 240, 236, 232, 228, 224, 220, 216, 212, 208 |
| 6 | 192, 189, 186, 183, 180, 177, 174, 171, 168, 165, 162, 159, 156, 153 |
| 4 | 128, 126, 124, 122, 120, 118, 116, 114, 112, 110, 108, 106, 104, 102 |

In Table 12, the code block sizes indicated by [ ] may not be supported. In Table 12, the constant c may be set to different values for Z or multiple sets of Z (the same value in a set). In addition, the granularity of the code block size may differ among the multiple sets of Z (the same granularity is used within a set). A transport block (TB) satisfying Transport Block Size (TBS)>8192 may be segmented into the code block sizes shown in Table 12 in the above-described manner.

TABLE 13

Example of code block sizes ($K_{ldpc}$ = 22, the set of Z: {384, 352, 320, 288, 256, 240, 224, 208, 192, 176, 160, 144, 128, 120, 112, 104, 96, 88, 80, 72, 64, 60, 56, 52, 48, 44, 40, 36, 32, 30, 28, 26, 24, 22, 20, 18, 16, 15, 14, 13, 12, 11, 10, 9, 8, 7, 6, 5, 4, 3, 2}, maximum code block size = 8448)

| Z | Code block size (CBS) range |
|---|---|
| 384 | 7743 <= CBS <= 8848 |
| 352 | 7041 <= CBS <= 7744 |
| 320 | 6337 <= CBS <= 7040 |
| 288 | 5633 <= CBS <= 6336 |
| 256 | 5281 <= CBS <= 5632 |
| 240 | 4927 <= CBS <= 5280 |
| 224 | 4577 <= CBS <= 4928 |
| 208 | 4225 <= CBS <= 4576 |
| 192 | 3873 <= CBS <= 4224 |
| 176 | 3521 <= CBS <= 3872 |
| 160 | 3169 <= CBS <= 3520 |
| 144 | 2817 <= CBS <= 3168 |
| 128 | 2641 <= CBS <= 2816 |
| 120 | 2465 <= CBS <= 2640 |
| 112 | 2289 <= CBS <= 2464 |
| 104 | 2113 <= CBS <= 2288 |

TABLE 13-continued

Example of code block sizes ($K_{ldpc}$ = 22, the set of Z: {384, 352, 320, 288, 256, 240, 224, 208, 192, 176, 160, 144, 128, 120, 112, 104, 96, 88, 80, 72, 64, 60, 56, 52, 48, 44, 40, 36, 32, 30, 28, 26, 24, 22, 20, 18, 16, 15, 14, 13, 12, 11, 10, 9, 8, 7, 6, 5, 4, 3, 2}, maximum code block size = 8448)

| Z | Code block size (CBS) range |
|---|---|
| 96 | 1937 <= CBS <= 2112 |
| 88 | 1761 <= CBS <= 1936 |
| 80 | 1585 <= CBS <= 1760 |
| 72 | 1409 <= CBS <= 1584 |
| 64 | 1321 <= CBS <= 1408 |
| 60 | 1233 <= CBS <= 1320 |
| 56 | 1145 <= CBS <= 1232 |
| 52 | 1057 <= CBS <= 1144 |
| 48 | 969 <= CBS <= 1056 |
| 44 | 881 <= CBS <= 968 |
| 40 | 793 <= CBS <= 880 |
| 36 | 705 <= CBS <= 792 |
| 32 | 661 <= CBS <= 704 |
| 30 | 617 <= CBS <= 660 |
| 28 | 573 <= CBS <= 616 |
| 26 | 529 <= CBS <= 572 |
| 24 | 485 <= CBS <= 528 |
| 22 | 441 <= CBS <= 484 |
| 20 | 397 <= CBS <= 440 |
| 18 | 353 <= CBS <= 396 |
| 16 | 331 <= CBS <= 352 |
| 15 | 309 <= CBS <= 330 |
| 14 | 287 <= CBS <= 308 |
| 13 | 265 <= CBS <= 286 |
| 12 | 243 <= CBS <= 264 |
| 11 | 221 <= CBS <= 242 |
| 10 | 199 <= CBS <= 220 |
| 9 | 177 <= CBS <= 198 |

TABLE 13-continued

Example of code block sizes ($K_{ldpc}$ = 22, the set of Z:
{384, 352, 320, 288, 256, 240, 224, 208, 192, 176, 160,
144, 128, 120, 112, 104, 96, 88, 80, 72, 64, 60, 56, 52, 48,
44, 40, 36, 32, 30, 28, 26, 24, 22, 20, 18, 16, 15, 14, 13,
12, 11, 10, 9, 8, 7, 6, 5, 4, 3, 2}, maximum code block size = 8448)

| Z | Code block size (CBS) range |
|---|---|
| 8 | 155 <= CBS <= 176 |
| 7 | 133 <= CBS <= 154 |
| 6 | 111 <= CBS <= 132 |
| 5 | 89 <= CBS <= 110 |
| 4 | 67 <= CBS <= 88 |
| 3 | 45 <= CBS <= 66 |
| 2 | CBS <= 44 |

A TB satisfying TBS>8448 may be segmented into the code block sizes of Table 13 in the manner described above. It is also possible to support only a part of the code block sizes (CBSs) shown in Table 13. Some of the values of Z in Table 13 may not be supported. In this case, the range of the CBS may be adjusted considering the supported value of Z. For example, when it is assumed that Z=352 is not supported, 7041≤CBS≤8448 is supported according to Z=384. In this case, the amount of shortening is relatively increased. If another value of Z is not supported, Z values that correspond to the CBS range may be set or specified in the same way.

Mapping of the CBS range and Z values in Table 13 may be applied to a case where a specific Z is given or the CBS is greater than or equal to a specific CBS. This is because, when the CBS is small, increasing the Z value and the amount of shortening may provide good performance. For example, the mapping in Table 13 may be used only when Z is 24 or the CBS is greater than or equal to 512. Only CBSs corresponding to multiples of 8 in Table 12 may be allowed. In this case, considering that data is processed in the MAC layer on a byte-by-byte basis, the system may be efficiently operated by minimizing padding. When the TB-level CRC is assumed to be 24 bits and the TBS satisfies Equation 2 given below, the CBSs may be segmented to have the same size.

$$TBS+CRC_{TB}=N_{CB}*CBS \quad \text{[Equation 2]}$$

In Equation 2, the CBS includes the CRC size. $N_{CB}$ denotes the number of CBs, and $CRC_{TB}$ denotes a CRC length added to the transport block. When Equation 2 is satisfied and a CBS in 8-bit units is supported, TBSs corresponding to Table 14 below may be supported. It is also possible to support TBSs corresponding to a part of Table 14.

TABLE 14

Example of a set of TBSs when segmentation is performed
into up to 11 code blocks supported when a CBS in
bits is assumed and the TB-level CRC is 24 bits

| $N_{CB}$ | TBS |
|---|---|
| 2 | TBS = 8440 + 2*k, (k = 0, . . . , 4216) |
| 3 | TBS = 12672 + 3*k, (k = 0, . . . , 4216) |
| 4 | TBS = 16904 + 4*k, (k = 0, . . . , 4216) |
| 5 | TBS = 21136 + 5*k, (k = 0, . . . , 4216) |
| 6 | TBS = 25368 + 6*k, (k = 0, . . . , 4216) |
| 7 | TBS = 29600 + 7*k, (k = 0, . . . , 4216) |
| 8 | TBS = 33832 + 8*k, (k = 0, . . . , 4216) |
| 9 | TBS = 38064 + 9*k, (k = 0, . . . , 4216) |
| 10 | TBS = 42296 + 10*k, (k = 0, . . . , 4216) |
| 11 | TBS = 46528 + 11*k, (k = 0, . . . , 4216) |

Even when a larger number of code blocks are segmented, supported TBSs may be defined based on the same principle.

In transmitting a transport block using an LDPC code, multiple base graphs (BGs) (e.g., H matrix) may be defined and transmitted.

Figure 12:
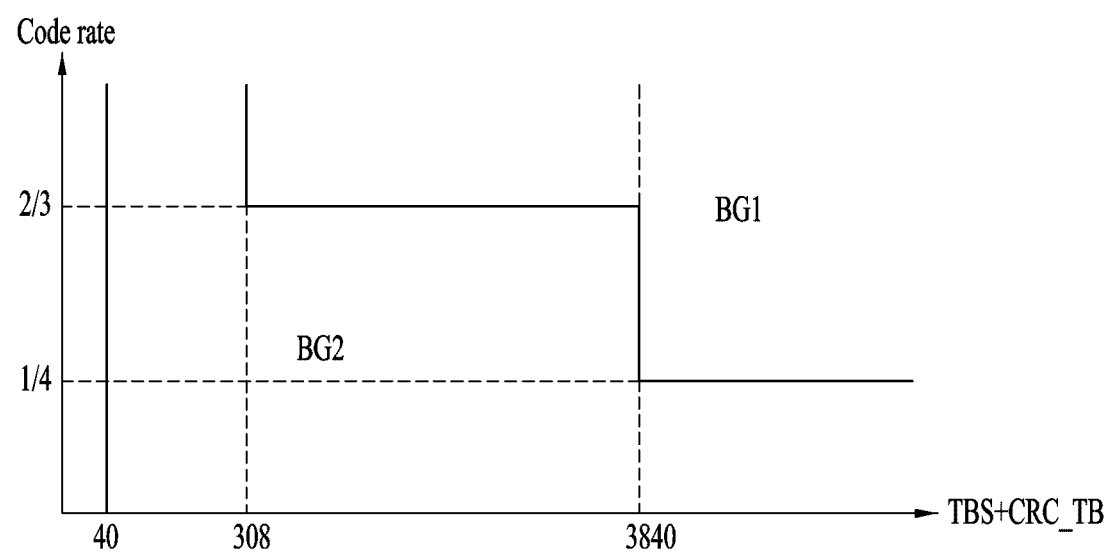
FIG. 12 is a chart showing a criterion for selecting a base graph in transmitting a transport block using two base graphs.

FIG. 12 is a chart showing a criterion for selecting a base graph in transmitting a transport block using two base graphs.

Referring to FIG. 12, TBS represents a transport block size, and CRC_TB represents a CRC length to be added to a transport block and has 16 bits in case of TBS<3824 and 24 bits in the other cases. For BG1 and BG2, refer to the definitions in Table 5.3.2-1, Table 5.3.2-2, and Table 5.3.2-3 of the standard 38.212 v1.1.0 [6]. Assuming that the size of minimum TBS+CRC_TB is 40 bits, BG2 is used for 40<=TBS+CRC_TB<=308. For 308<TBS+CRC_TB<=3840, use of BG1 and BG2 is determined based on code rate 2/3. In the case of TBS+CRC_TB>3840, use of BG1 and BG2 is determined based on code rate 1/4. Here, if BG1 is used, code block segmentation is performed when TB S+CRC_TB>8448. If BG2 is used, code block segmentation is performed when TBS+CRC_TB>3840.

BG1/BG2 may be supported simultaneously or selectively according to the UE capability/category. For a UE supporting only BG1, only code block segmentation using BG1 is performed because BG2 cannot be used even when the code rate <1/4. That is, in performing segmentation, the number of code blocks may be calculated with ceil(TBS+CRC_TB/(8448-24)). Similarly, for a UE supporting only BG2, segmentation using BG2 is performed because code block segmentation of BG1 cannot be used. That is, in performing segmentation, the number of code blocks may be calculated with ceil(TBS+CRC_TB/(3840-24)). For a UE simultaneously or selectively supporting BG1/BG2, it is preferable to perform segmentation into code blocks of the same size without zero padding. This is because the zero padding bit is a bit that does not contain information. When code block segmentation is performed using BG1 or BG2, the TB with CRC may be segmented into code blocks of the same size if Equations 3 and 4 given below are satisfied.

$$TBS+CRC\_TB=N1*CBS \quad \text{[Equation 3]}$$

$$TBS+CRC\_TB=N2*CBS \quad \text{[Equation 4]}$$

In Equations 3 and 4, N1 and N2 are the numbers of code blocks obtained when code block segmentation is performed using BG1 and BG2, and CBS has a value that does not include a code block CRC length (e.g., 24 bits). In order to perform code block segmentation of the same size in which zero padding does not occur regardless of the UEs simultaneously or selectively supporting BG1/BG2, TBS+CRC_TB satisfying both Equations 3 and 4 may be defined for a transport block corresponding to 3840<TB S+CRC_TB in FIG. 12. That is, when it is assumed that the transport block is byte-aligned, the size of the transport block is a multiple of 8. Accordingly, when TBS is designed such that TBS+CRC_TB is a multiple of the least common multiple of (8, N1, N2), Equations 3 and 4 may be satisfied without zero padding. That is, when N1=2 and N2=3, the least common multiple of (8, 2, 3) is 24, and accordingly TB S+CRC_TB may be designed to be a multiple of 24.

Table 15 below shows an embodiment of TBS+CRC_TB that satisfies Equations 3 and 4 without zero padding according to the range of TBS+CRC_TB. In Table 15, TBS granularity example 1 is the minimum granularity of TBS satisfying Equations 3 and 4, and TBS granularity example 2 is an example of granularity increased with TBS among the granularities satisfying Equations 3 and 4. The maximum TBS with the code block segmentation using BG2 may depend on the maximum MCS index with a code rate <1/4 in the MCS table and the amount of available resources (e.g., the number of resource elements (REs)). For example, when allocation of 120 REs and 275 REs are assumed per RB and the MCS table is assumed, the maximum TBS with the code block segmentation using BG2 is about 19200 bits. A TBS larger than the TBS on which segmentation using BG2 is performed may be designed to satisfy the granularity of a multiple of the least common multiple of (8, N1).

TABLE 15

TBS + CRC_TB conditions for equal-size code block segmentation without zero padding (CRC_TB = 24)

| Input bit sequence (B) = TBS + CRC_TB | Number of CBs (BG1) | Number of CBs (BG2) | TBS granularity example 1 (grn) | TBS granularity example 2 (gm) |
|---|---|---|---|---|
| 3824 < B <= 7632 | 1 | 2 | 8 | 8 |
| 7632 < B <= 8448 | 1 | 3 | 24 | 24 |
| 8448 < B <= 11448 | 2 | 3 | 24 | 24 |
| 11448 < B <= 15264 | 2 | 4 | 8 | 24 |
| 15264 < B <= 16848 | 2 | 5 | 40 | 40 |
| 16848 < B <= 19080 | 3 | 5 | 40 | 40 |
| 19080 < B <= 22896 | 3 | 6 | 24 | 96 |
| 22896 < B <= 25272 | 3 | 7 | 168 | 168 |
| 25272 < B <= 26712 | 4 | 7 | 56 | 168 |
| 26712 < B <= 30528 | 4 | 8 | 8 | 168 |

Based on Table 15, the size of TBS+CRC_TB may be represented as Equations 5 and 6.

$$TBS + CRC\_TB = grn \left\lceil \frac{N_{RE} \cdot v \cdot Q_m \cdot R}{grn} \right\rceil \quad \text{[Equation 5]}$$

$$TBS + CRC\_TB = grn \left\lfloor \frac{N_{RE} \cdot v \cdot Q_m \cdot R}{grn} \right\rfloor \quad \text{[Equation 6]}$$

In Equations 5 and 6, v denotes the number of layers, $Q_m$ denotes the modulation order acquired from the MCS index, R denotes the code rate acquired from the MCS index, $N_{RE}$ denotes the number of REs, where $N_{RE}$=Y*#PRBs_scheduled (Y*number of scheduled PRBs), and grn denotes the value shown in the granularity embodiment of Table 15.

For a UE supporting only BG1 or BG2, the TBS at which zero padding occurs may be designed to be a multiple of the least common multiple of (8, N1) or (8, N2).

The following embodiment shows code block segmentation for a payload size greater than or equal to 1648 bits for the LDPC encoder. Here, it is assumed that the CRC size added to the transport block and the code block is 24.

Embodiment 1) Transport Block Size K=1920, and r=3/4

When 24-bit CRC is added, 1944>1648, and thus code block segmentation is performed. The CBSs supported when code rate r=3/4 are 486, 972, and 1458 bits. Since 1992=2*(972+24), the TB with CRC is segmented into two code blocks each having the size of 972 bits.

Embodiment 2) Transport Block Size K=1668, and r=1/2

When 24-bit CRC is added, 1692>1648, and thus code block segmentation is performed. The CBSs supported when the code rate r=1/2 are 324, 648, and 972 bits. Since 1692=2*(822+24), segmentation may be performed into 2 code blocks each having the size of 846 bits. However, this size is not a CBS supported when r=1/2, and accordingly segmentation is performed into code blocks having different sizes. Since 1692=2*648+324, segmentation is performed into two code blocks each having a size of 648 bits and one code block having a size of 324 bits.

Embodiment 3) Transport Block Size K=1916, and r=1/2

When 24-bit CRC is added, 1940>1648, and thus code block segmentation is performed. The CBSs supported when the code rate r=1/2 are 324, 648, and 972 bits. Since 1940=2*970, segmentation may be performed into two code blocks each having a size of 970 bits, but this is not a CBS supported when r=1/2. Since 1940=2*972-4, segmentation may be performed into two code blocks with a size of 972 bits. Then, a specific code block may be shortened by 4 bits, or each code block may be shortened by 2 bits to generate encoded bits.

Hereinafter, retransmission based on a code block group (CBG) (i.e., multiple code blocks) will be described.

A code block group (CBG) may be composed of a plurality of code blocks. A TB may be composed of a plurality of CBGs. The number of CBGs for each TB may be 2, 4, 6, or 8.

CBG-based retransmission may be configured on the receiving side (e.g., the UE). And HARQ-ACK may be configured to be transmitted for a plurality of code blocks. That is, the receiving side may decode a predetermined number of code blocks (P code blocks) constituting the CBG, and may then transmit HARQ-ACK to the transmitting side only when all the code blocks are successfully decoded. Otherwise, the receiving side may transmit NACK. This may prevent the system efficiency from deteriorating when retransmission is performed on a transport block basis in a case where there are many code blocks constituting a transport block. That is, the receiving side (e.g., the UE) receives a downlink control channel including a DCI format related to the CBG transmission basis, and receives a downlink data channel (e.g., a PDSCH) based on scheduling of the downlink control channel. The receiving side (e.g., the UE) may transmit HARQ ACK/NACK feedback on a CBG-by-CBG basis in response to reception of the PDSCH, and the transmitting side performs retransmission only for a corresponding CBG in which an error has occurred. As a result, system efficiency may be improved. In this CBG-based retransmission, HARQ ACK/NACK feedbacks of the respective CBGs may be multiplexed and transmitted.

Figure 13:
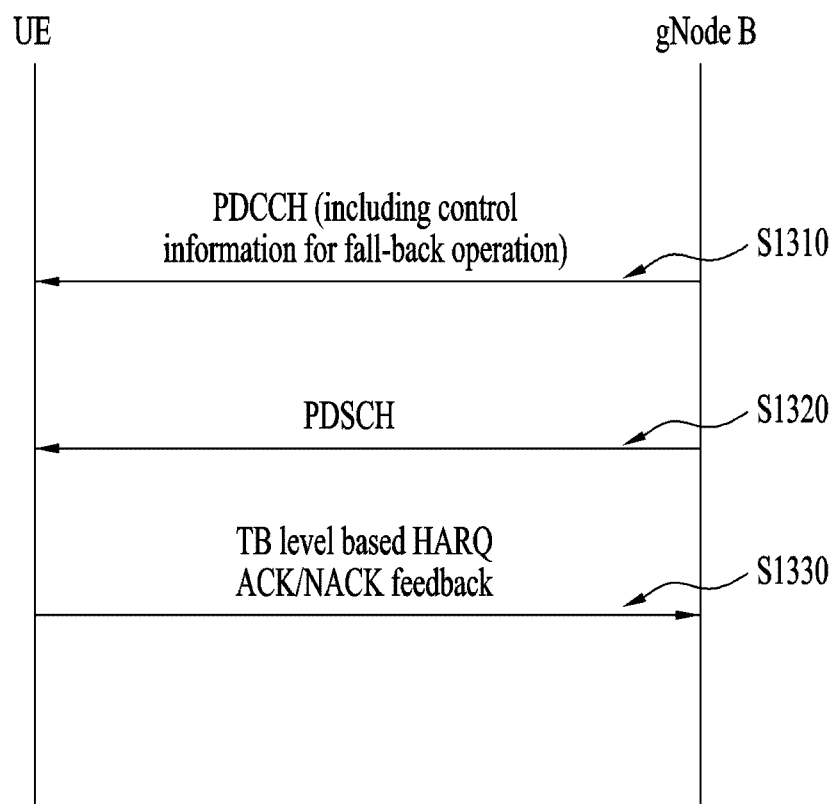
FIG. 13 is a diagram illustrating a method for transmitting HARQ ACK/NACK feedback according to a fall-back operation according to an embodiment of the present invention.

FIG. 13 is a diagram illustrating a method for transmitting HARQ ACK/NACK feedback according to a fall-back operation according to an embodiment of the present invention.

The BS may configure the number of code blocks for transmitting HARQ-ACK in a higher layer and transmit the same to the UE through higher layer signaling (e.g., RRC signaling). However, in a specific situation where the BS reconfigures the value of P of higher layer signaling (e.g., RRC signaling), there may be ambiguity about the P value between the transmitting side (e.g., the gNodeB) and the receiving side (e.g., the UE).

In order to eliminate such ambiguity, the receiving side (e.g., the UE) may perform a fall-back operation of transmitting HARQ-ACK with a default P value. That is, in a specific situation, for example, during the higher layer reconfigured period, the receiving side (e.g., the UE) transmits HARQ-ACK on the assumption that P has a specific value. At this time, the transmitting side (e.g., the gNodeB) may transmit, to the UE, a downlink control channel containing control information for the fall-back operation described above as a downlink control channel for scheduling the corresponding user data. Here, the fall-back operation means that TB-based or TB-level HARQ ACK/NACK feedback is performed.

Even when CBG-based retransmission is configured on the receiving side (e.g., the UE), the transmitting side (e.g., the gNodeB) schedules the corresponding user data and transmits a downlink control channel including control information indicating the fall-back operation (S1310), receives a PDSCH scheduled by the DL control channel (S1320), and performs TB-based or TB level HARQ ACK/NACK feedback for the received PDSCH. If it is not the specific situation described above, the receiving side (e.g., the UE) may transmit HARQ ACK/NACK feedback based on the CBG.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for transmitting a hybrid automatic repeat request acknowledgement/negative acknowledgement (HARQ ACK/NACK) feedback by a terminal, the method comprising:
    transmitting, to a base station, HARQ ACK/NACK feedback for each code block group (CBG) for first downlink data;
    receiving, from the base station, a control channel containing control information for a fallback operation of the terminal, wherein the control channel is received during a period for reconfiguring the number of code blocks in a CBG for transmission of HARQ ACK/NACK feedback;
    receiving, from the base station, second downlink data based on the control channel; and
    transmitting, to the base station, HARQ ACK/NACK feedback for each transport block (TB) of the second downlink data based on the control information even when CBG-based retransmission is configured in the terminal,
    wherein a TB with cyclic redundancy check (CRC) for the first downlink data is segmented into two code blocks with a size of 972 bits and one of the two code blocks is shortened by 4 bits, based on 1916 bits of the TB for the first downlink data and based on 24 bits of the CRC and based on a code rate of 1/2 supported for the first downlink data.

2. The method of claim 1, wherein the transmitting of the HARQ ACK/NACK feedback for each CBG comprises:
    transmitting HARQ ACK feedback for a corresponding CBG only when decoding is successfully performed on all code blocks in the corresponding CBG.

3. The method of claim 1, wherein the TB comprises a plurality of CBGs.

4. The method of claim 1, further comprising:
    receiving RRC signaling for reconfiguring a number of code blocks in the CBG.

5. The method of claim 1, wherein the HARQ ACK/NACK feedbacks for each CBG of the first downlink data are multiplexed and transmitted.

6. A method for receiving a hybrid automatic repeat request acknowledgement/negative acknowledgement (HARQ ACK/NACK) feedback by a base station, the method comprising:
    receiving, from a terminal, HARQ ACK/NACK feedback for each code block group (CBG) for first downlink data;
    transmitting, to the terminal, a control channel containing control information for a fallback operation of the terminal, wherein the control channel is transmitted during a period for reconfiguring the number of code blocks in a CBG for transmission of HARQ ACK/NACK feedback;

transmitting, to the terminal, second downlink data based on the control channel; and receiving, from the terminal, HARQ ACK/NACK feedback for each transport block (TB) of the second downlink data based on the control information even when CBG-based retransmission is configured in the terminal, wherein a TB with cyclic redundancy check, CRC, for the first downlink data is segmented into two code blocks with a size of 972 bits and one of the two code blocks is shortened by 4 bits, based on 1916 bits of the TB for the first downlink data and based on 24 bits of the CRC and based on a code rate of 1/2 supported for the first downlink data.

7. A terminal for transmitting a hybrid automatic repeat request acknowledgement/negative acknowledgement (HARQ ACK/NACK) feedback, comprising:

a transmitter;
a receiver; and
a processor,
wherein the processor is configured to:
control the transmitter to transmit, to a base station, HARQ ACK/NACK feedback for each code block group (CBG) for first downlink data;
control the receiver to receive, from the base station, a control channel containing control information for a fallback operation of the terminal, wherein the control channel is received during a period for reconfiguring the number of code blocks in a CBG for transmission of HARQ ACK/NACK feedback;
control the receiver to receive, from the base station, second downlink data based on the control channel; and
control the transmitter to transmit, to the base station, HARQ ACK/NACK feedback for each transport block (TB) of the second downlink data based on the control information, even when CBG-based retransmission is configured in the terminal,
wherein a TB with cyclic redundancy check, CRC, for the first downlink data is segmented into two code blocks with a size of 972 bits and one of the two code blocks is shortened by 4 bits, based on 1916 bits of the TB for the first downlink data and based on 24 bits of the CRC and based on a code rate of 1/2 supported for the first downlink data.

8. The terminal of claim 7, wherein the processor is configured to control the transmitter to HARQ ACK feedback for a corresponding CBG only when decoding is successfully performed on all code blocks in the corresponding CBG.

9. The terminal of claim 7, wherein the TB comprises a plurality of CBGs.

10. The terminal of claim 7, wherein the processor controls the receiver to receive RRC signaling for reconfiguring a number of code blocks in the CBG.

11. The terminal of claim 8, wherein the processor is configured to multiplex the HARQ ACK/NACK feedbacks for each CBG of the first downlink data, wherein the processor controls the transmitter to transmit the multiplexed HARQ ACK/NACK feedbacks.

12. A base station for receiving a hybrid automatic repeat request acknowledgement/negative acknowledgement (HARQ ACK/NACK) feedback, comprising:

a receiver;
a transmitter; and
a processor,
wherein the processor is configured to:
control the receiver to receive, from a terminal, HARQ ACK/NACK feedback for each code block group (CBG) for first downlink data;
control the transmitter to transmit, to the terminal, a control channel containing control information for a fallback operation of the terminal, wherein the control channel is transmitted during a period for reconfiguring the number of code blocks in a CBG for transmission of HARQ ACK/NACK feedback;
control the transmitter to transmit, to the terminal, second downlink data based on the control channel; and
control the receiver to receive, from the terminal, HARQ ACK/NACK feedback for each transport block (TB) of the second downlink data based on the control information even when CBG-based retransmission is configured in the terminal,
wherein a TB with cyclic redundancy check, CRC, for the first downlink data is segmented into two code blocks with a size of 972 bits and one of the two code blocks is shortened by 4 bits, based on 1916 bits of the TB for the first downlink data and based on 24 bits of the CRC and based on a code rate of 1/2 supported for the first downlink data.

* * * * *